US012773915B1

(12) United States Patent
Sylvester et al.

(10) Patent No.: US 12,773,915 B1
(45) Date of Patent: *Oct. 27, 2026

(54) STRUCTURAL SHROUD FOR EMBEDDED WIRELESS CHARGER

(71) Applicant: INTEGRATED ROADWAYS IP LLC, Miami Beach, FL (US)

(72) Inventors: Tim Sylvester, Kansas City, MO (US); Tiziano Pedersoli, Overland Park, KS (US)

(73) Assignee: INTEGRATED ROADWAYS IP LLC, Miami Beach, FL (US)

(*) Notice: Subject to any disclaimer, the term of this patent is extended or adjusted under 35 U.S.C. 154(b) by 771 days.

This patent is subject to a terminal disclaimer.

(21) Appl. No.: 18/320,343

(22) Filed: May 19, 2023

(51) Int. Cl.
*H01M 10/46* (2006.01)
*B60L 53/12* (2019.01)
*E01C 1/00* (2006.01)
*E01C 9/00* (2006.01)
*H02J 50/00* (2016.01)

(52) U.S. Cl.
CPC .............. *B60L 53/12* (2019.02); *E01C 1/002* (2013.01); *E01C 9/001* (2013.01); *H02J 50/005* (2020.01)

(58) Field of Classification Search
CPC . H02J 50/005; H02J 7/70; B60L 53/12; E01C 1/002; E01C 9/001
USPC ......................... 320/104, 107, 108, 114, 115
See application file for complete search history.

(56) References Cited

U.S. PATENT DOCUMENTS 4,836,344 A * 6/1989 Bolger .................... H02J 50/10 191/10
8,561,770 B2 10/2013 Stoicoviciu
9,337,902 B2 5/2016 Raab et al.
9,969,282 B2 5/2018 Van Boheemen et al.
10,343,536 B2 * 7/2019 Moghe .................... B60L 53/12
10,563,507 B2 2/2020 Tessien
11,521,780 B2 12/2022 Roberts et al.
(Continued)

FOREIGN PATENT DOCUMENTS

KR 1020180082439 A 7/2018
WO WO-2012116054 A2 * 8/2012 .............. B60L 53/39
WO WO-2022035913 A2 * 2/2022 ............. B65G 54/02

OTHER PUBLICATIONS

Rahulkumar, et al., "An Empirical Survey on Wireless Inductive Power Pad and Resonant Magnetic Field Coupling for In-Motion EV Charging System," in IEEE Access, vol. 11, 2023, pp. 4660-4693.
(Continued)

*Primary Examiner* — Edward Tso
(74) *Attorney, Agent, or Firm* — Fredrikson & Byron, P.A.

(57) ABSTRACT

A roadway section for enabling dynamic wireless power transfer to a vehicle, including pavement material defining a driving surface for the vehicle, a wireless power charger including an electrically-conductive element embedded in the pavement material, and a shroud at least partially circumscribing the electrically-conductive element. The electrically-conductive element may be in electrical communication with a power supply and may emit a magnetic field for dynamic wireless power transfer to the vehicle. At least a portion of an external surface of the shroud has a macro-shaped non-planar cross-sectional profile integrating the shroud with the pavement material surrounding the shroud,
(Continued)

thus assisting with adherence to the pavement material of the roadway section.

20 Claims, 12 Drawing Sheets

(56) References Cited

U.S. PATENT DOCUMENTS

| | | | | |
|---|---|---|---|---|
| 12,083,933 | B2 | 9/2024 | Boys et al. | |
| 12,139,030 | B1 | 11/2024 | Booth et al. | |
| 12,246,604 | B1 * | 3/2025 | Sylvester ................ | H02J 50/10 |
| 2011/0164471 | A1 | 7/2011 | Baarman et al. | |
| 2014/0232331 | A1 | 8/2014 | Stamenic et al. | |
| 2015/0323694 | A1 * | 11/2015 | Roy ........................ | H02J 50/70<br>307/104 |
| 2017/0274778 | A1 | 9/2017 | Van Boheemen et al. | |
| 2019/0023135 | A1 | 1/2019 | Boys et al. | |
| 2022/0049441 | A1 * | 2/2022 | Giannotta ............... | E01F 11/00 |
| 2023/0122088 | A1 | 4/2023 | Mccool et al. | |

OTHER PUBLICATIONS

Varghese et al., "Design Considerations for 50 kW Dynamic Wireless Charging with Concrete-Embedded Coils," 2020 IEEE PELS Workshop on Emerging Technologies: Wireless Power Transfer (WoW), 2020, pp. 40-44.

Zhang, et al., "An Electric Roadway System Leveraging Dynamic Capacitive Wireless Charging: Furthering the Continuous Charging of Electric Vehicles," in IEEE Electrification Magazine, vol. 8, No. 2, Jun. 2020, pp. 52-60.

* cited by examiner

STRUCTURAL SHROUD FOR EMBEDDED WIRELESS CHARGER

CROSS-REFERENCE TO RELATED APPLICATIONS

The present application is filed contemporaneously with identically-titled U.S. patent application Ser. No. 18/320,337, filed May 19, 2023, the entire disclosure of which is hereby incorporated by reference herein.

BACKGROUND OF THE INVENTION

Field of the Invention

This invention relates generally to the field of pavement systems and, in particular, to a roadway section including an embedded wireless charge element and a shroud associated therewith.

Description of the Related Art

A road surface or pavement is a durable surface material laid down on a roadway, walkway, or other such areas and intended to sustain vehicular or foot traffic. In the past, gravel road surfaces, cobblestone and granite slabs were used, but these have mostly been replaced by asphalt or concrete laid on a compacted base course. Such materials may be laid onto the roadway via a continuous pour system. Attractive alternatives to continuous pour systems include pre-fabricated, modular pavement slabs, which may be individually removed, repaired and/or replaced with relative ease. In contrast, traditional continuous pour systems require significantly more time and/or money for removal and replacement.

Roadways are increasingly used by electric vehicles (e.g., electric cars or trucks) with rechargeable batteries providing a primary propulsion system for the electric vehicle. However, charging of such electric vehicles may be time-consuming, which may be detrimental on long road trips.

BRIEF SUMMARY

The present invention addresses one or more of the above-described problems and other problems by providing a roadway section that enables dynamic wireless power transfer to a vehicle. Furthermore, the present invention includes a shroud at least partially circumscribing an electrically-conductive element, the shroud having micro-texturing and/or macro-shaping for adherence to pavement material in order to assist with adherence to pavement material of the roadway section.

One or more embodiments comprise a roadway section for enabling dynamic wireless power transfer to a vehicle. The roadway section may include pavement material defining a driving surface for the vehicle, a wireless power charger including an electrically-conductive element embedded in the pavement material, and a shroud at least partially circumscribing the electrically-conductive element. The electrically-conductive element may be in electrical communication with a power supply and may emit a magnetic field for dynamic wireless power transfer to the vehicle. The shroud may have an external surface, and at least a portion of the external surface may have a micro-textured profile integrating the shroud with the pavement material surrounding the shroud, thus assisting with adherence to the pavement material of the roadway section.

In one or more embodiments, a roadway section for enabling dynamic wireless power transfer to a vehicle may include pavement material defining a driving surface for the vehicle, a wireless power charger including an electrically-conductive element embedded in the pavement material, and a shroud at least partially circumscribing the electrically-conductive element. The electrically-conductive element may likewise be in electrical communication with a power supply and may emit a magnetic field for dynamic wireless power transfer to the vehicle. Moreover, in one or more embodiments, at least a portion of an external surface of the shroud has a macro-shaped non-planar cross-sectional profile integrating the shroud with the pavement material surrounding the shroud, thus assisting with adherence to the pavement material of the roadway section.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 20A:
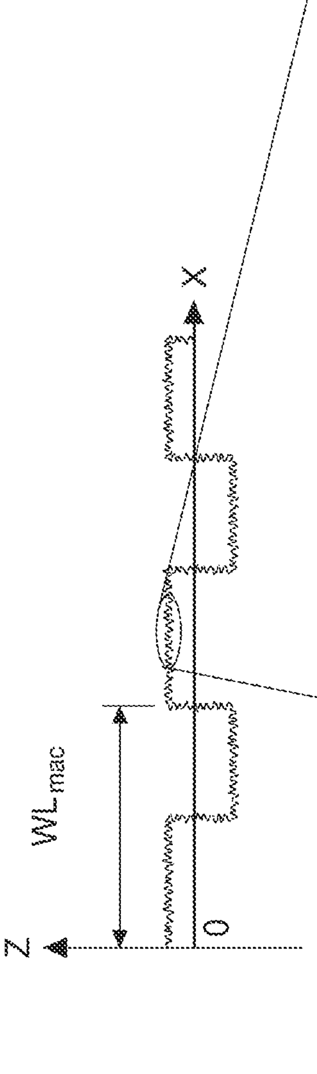
Figure 20B:
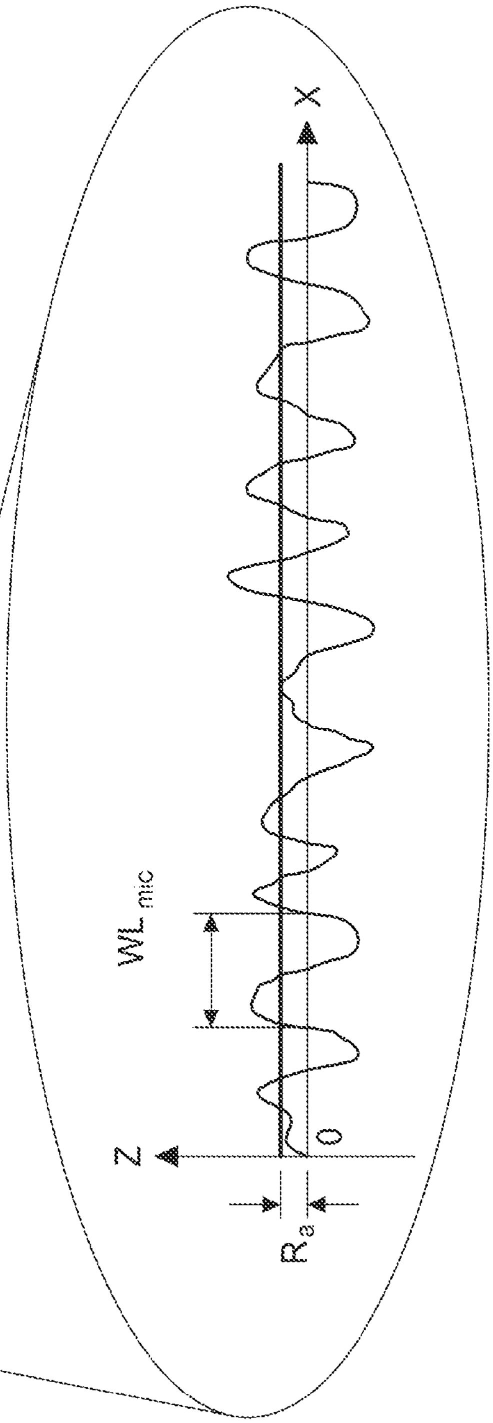

FIG. 20A is a chart depicting example depth measurements taken from a macro-shaped square wave-patterned surface in accordance with embodiments of the present invention; and FIG. 20B is a chart depicting example depth measurements taken from a micro-textured or micro-shaped surface of the macro-shaped square wave-patterned surface depicted in FIG. 20A, in accordance with embodiments of the present invention.

The drawing figures do not limit the current invention to the specific embodiments disclosed and described herein. While the drawings do not necessarily provide exact dimensions or tolerances for the illustrated components or structures, the drawings are to scale as examples of certain embodiments with respect to the relationships between the components of the structures illustrated in the drawings.

DETAILED DESCRIPTION OF THE EMBODIMENTS

The following detailed description of the invention references the accompanying drawings that illustrate specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology may include a variety of combinations and/or integrations of the embodiments described herein.

Figure 1:
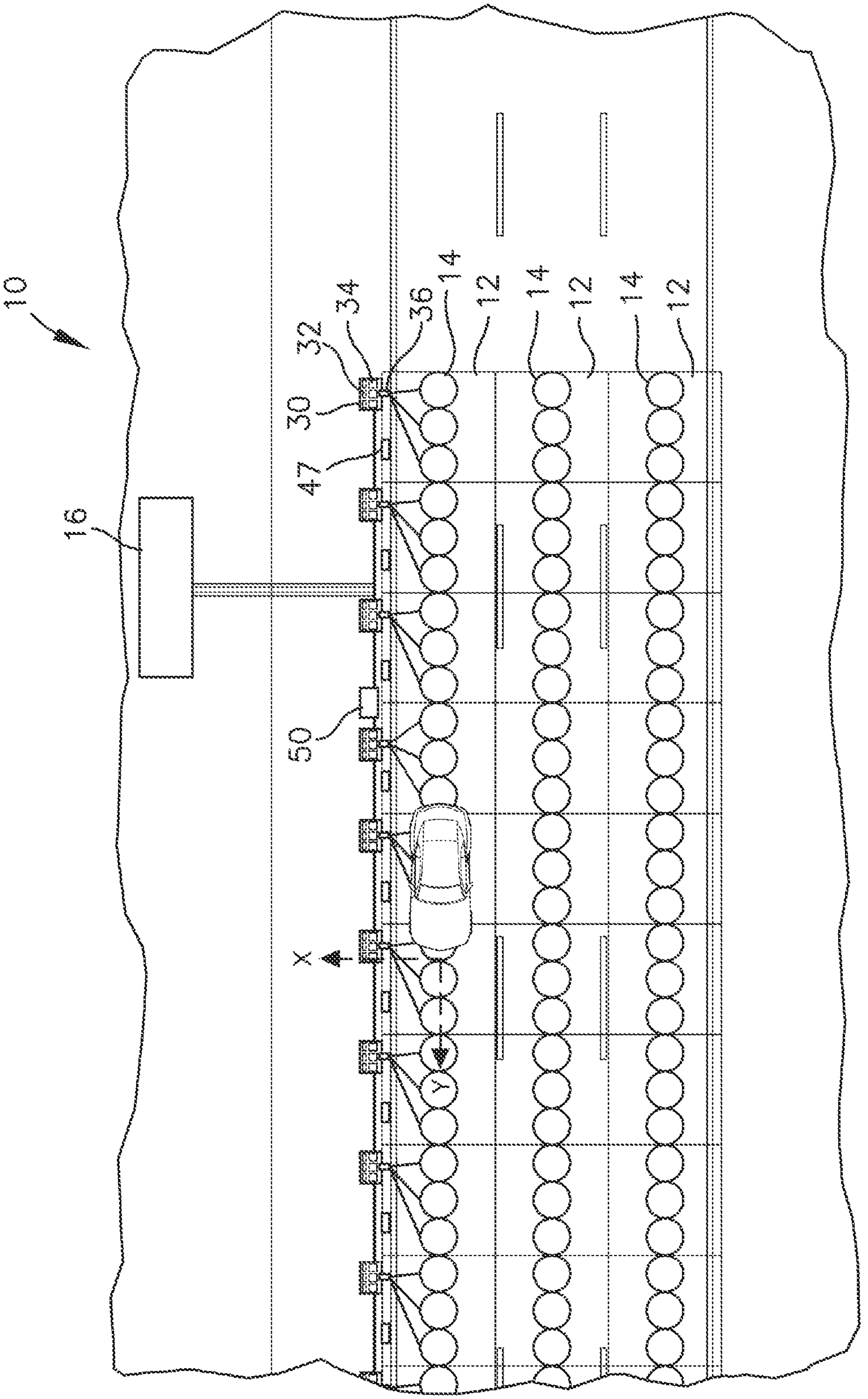
FIG. 1 is a top plan view of a pavement system constructed in accordance with embodiments of the present invention and illustrating a plurality of modular pavement slabs.

FIG. 1 illustrates an exemplary pavement system 10 in accordance with embodiments of the present invention. The system 10 includes a plurality of slabs 12 aligned along a longitudinal or y-axis corresponding to a direction of travel of vehicles or other masses across top surfaces of the slabs 12. The system includes three (3) lanes, each being respectively formed from a plurality of slabs 12 aligned along the y-axis. Each lane may include one or more roadway sections, each of which may include one or more slabs 12. It is foreseen that the pavement system may include more or fewer lanes without departing from the spirit of the present invention.

The slabs 12 may be pre-cast slabs comprising concrete paving material, described in the exemplary embodiment in more detail below. It should be noted, however, that in one or more embodiments the pavement system may comprise one or more lanes formed of cast-in-place concrete installations, continuous pour asphalt pavement material, or other pavement types. In cast-in-place installations, roadway sections may include one or more lengths of roadway separated by saw cut joints, typically made to reduce the chances of roadway damage/cracking from cyclical expansion and contraction.

Each slab 12 of the illustrated embodiment includes three (3) wireless chargers 14, also referred to herein as wireless power chargers. The wireless chargers 14 may include or comprise wireless charge emitters and/or transceivers. Each wireless charge emitter and/or transceiver (see FIG. 3A) preferably includes one or more coil(s) or layers of conductive material configured to conduct current of supplied power in a spatial pattern that generates and projects an electromagnetic (EMF) field and/or magnetic field extending up and above a top surface 76 of the corresponding roadway section for wireless battery charging of passing vehicles (e.g., according to Faraday's law of induced voltage). The term "electrically conductive material" means a material within which electric current freely flows, i.e., a material with a resistivity of less than about one thousand (1,000) ohm-meter. Examples of electrically conductive materials include steel, iron, aluminum, copper, graphite and conductive carbon. Correspondingly the term "non-electrically conductive material" means a material within which electric current does not freely flow, i.e., a material with a resistivity greater than about one thousand (1,000) ohm-meter or at least ten thousand (10,000) ohm-meter. Examples of non-electrically conductive materials (e.g., electrical insulators) include polymer and ferrite.

Each of the wireless chargers 14 may be configured for unidirectional charging of batteries of vehicles passing along a top surface of the slabs 12 or for bidirectional charging in communication with electrical circuits positioned on or adjacent to the top surface of the slabs. In one or more embodiments, the wireless chargers 14 are configured to produce, generate, or emit a magnetic field upward for induced charging of an electrical circuit (e.g., a battery circuit) of a passing vehicle. The electrically-conductive element 15 of each wireless charger 14 may comprise one or more conductive wires or plates arranged, placed, or positioned to form a coil or toroid shape that is substantially symmetrical across at least two (preferably perpendicular) axes. One of ordinary skill will appreciate that the coil or toroid may be rectangular, may be a spiral, may comprise a toroid with a rectangular or polygonal cross-section, may comprise a toroid with a circular cross section, or may be more irregularly shaped while retaining the symmetrical properties outlined herein, without departing from the spirit of the present invention. One of ordinary skill will appreciate that an individual slab or roadway section may include more or fewer wireless chargers, at different and/or variable spacing and/or of different configuration/shape, without departing from the spirit of the present invention.

One of ordinary skill will appreciate that each wireless power charger 14 preferably includes one or more additional electrically conductive wires or other conductors—such as power supply wires—in addition to the electrically-conductive element for generating the magnetic field for inductive charging within the scope of the present invention. It should also be noted that the preferred wireless power charger 14 will additionally be encased, housed or coated in an electrically insulating or non-electrically conductive material layer (e.g., comprising rubber, resin, or other polymer, etc.). In the illustrated embodiments, the aforementioned layer is relatively thin and, for purposes of illustration, lies at and covers or coats the outside (e.g., outer and upper) boundaries or margins of the electrically conductive element. However, it is foreseen that in one or more embodiments the casing/housing or other non-conductive features of the chargers, and/or the conductors which are not part of the electrically conductive element, may in some cases extend significantly outside of the boundaries or margins (e.g., the upper and/or radially outer surfaces or profiles) of an electrically conductive element (for example) without departing from the spirit of the present invention.

Figure 5:
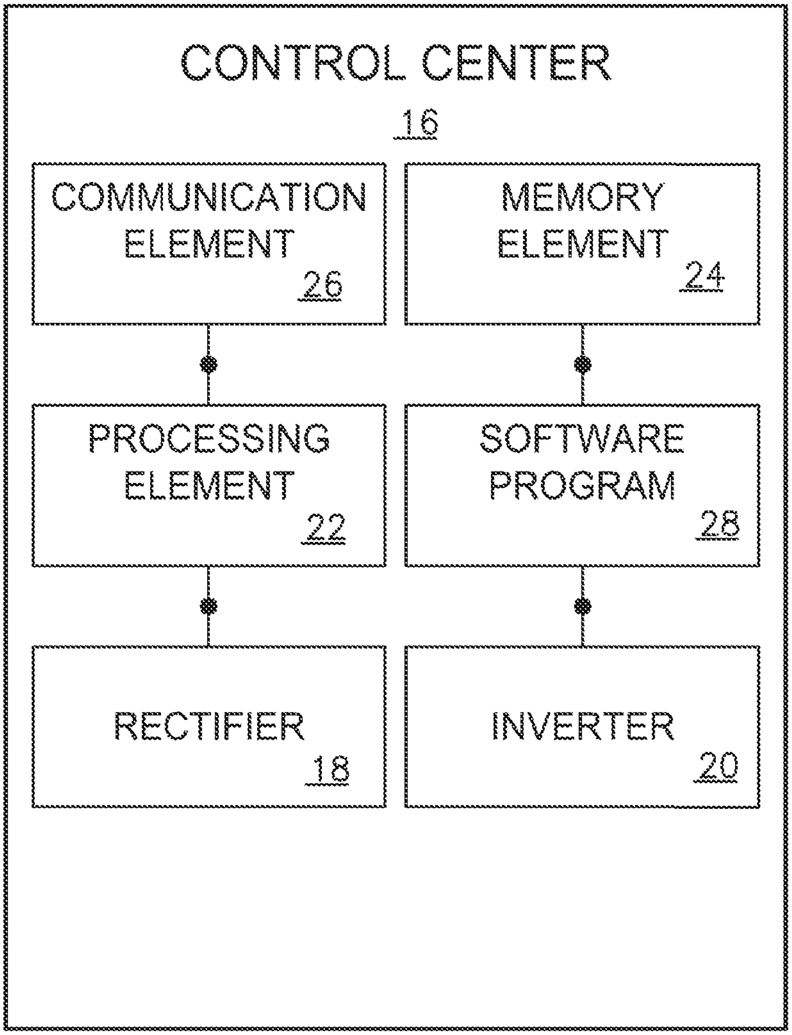
FIG. 5 is a schematic block diagram of various electronic components and control components of a control center of the pavement system of FIG. 1.

Power to the wireless chargers 14 is supplied, conditioned, tuned, transformed, converted and/or otherwise changed and/or controlled by one or more control centers 16. Turning briefly to FIG. 5, each control center 16 may include a rectifier 18, an inverter 20, a processing element 22, a memory element 24, a communication element 26, and a software program 28, each of which is discussed in more detail below. It should also be noted that one or more components of a control center may be housed remotely and/or embedded in or with components of a roadway section without departing from the spirit of the present invention.

The control center 16 receives power from a power supply such as a public utility line and/or from upstream switchgear (not shown) and prepares same for supply to the wireless chargers 14. For example, in one or more embodiments, the control center 16 receives alternating current (AC) power at 750 KW and 110A and increases the frequency of the power using the rectifier 18 and inverter 20 for supply to the wireless chargers 14.

The control center 16 may initially supply power to junction boxes 30. The switching device(s) 32 and corresponding tuning network device(s) 34 may serve as intermediate components for electrical communication between the wireless chargers 14 and the control center 16. One of ordinary skill will appreciate that more, fewer and/or different intermediate components may be used to supply power to wireless chargers without departing from the spirit of the present invention. The exemplary junction boxes 30 are adjacent the sides of the corresponding slabs 12 and may be set or embedded in a shoulder of the roadway, with top portions approximately flush with the top surface of the roadway to provide periodic access thereto for maintenance.

Each junction box 30 may contain or include one or more switching device(s) 32 and corresponding tuning network device(s) 34, with each pair of switching device 32 and tuning network device 34 supplying power to one of the wireless chargers 14. The switching device 32 may, for example, be a metal-oxide-semiconductor field-effect transistor (MOSFET) switch or any other switch device for switching and/or amplifying the power signal to the corresponding wireless charger 14. The tuning network device 34 may, for example, be a transformer configured to increase or decrease the voltage and/or other characteristics of the power for supply to the corresponding wireless charger 14. The wires or conductors carrying the power to the wireless chargers 14 may be routed through one or more conduits and/or edge connectors 36 illustrated in FIG. 1.

In one or more embodiments, the processing element 22, the memory element 24, the communication element 26 and/or the software program 28 comprise a master controller. The master controller may be in electronic communication (e.g., via the communication element 26) with one or both of the switching device 32 and/or tuning network device 34 corresponding to each of the wireless chargers 14. The electronic communication may permit such electronic devices in each of the junction boxes 30 to provide data regarding operation and/or faults of the wireless chargers 14 and/or supporting power supply or control infrastructure and/or intermediate components. The electronic communication may also or alternatively permit the master controller to communicate commands to electronic components of the junction box 30 and/or components of the wireless chargers 14, for example where the master controller commands one or more switching device(s) 32 to power or shut down power to the corresponding wireless charger(s) 14 or commands one or more network tuning device(s) 34 to increase or decrease the voltage of the power supplied to the corresponding wireless charger(s) 14.

Figure 2:
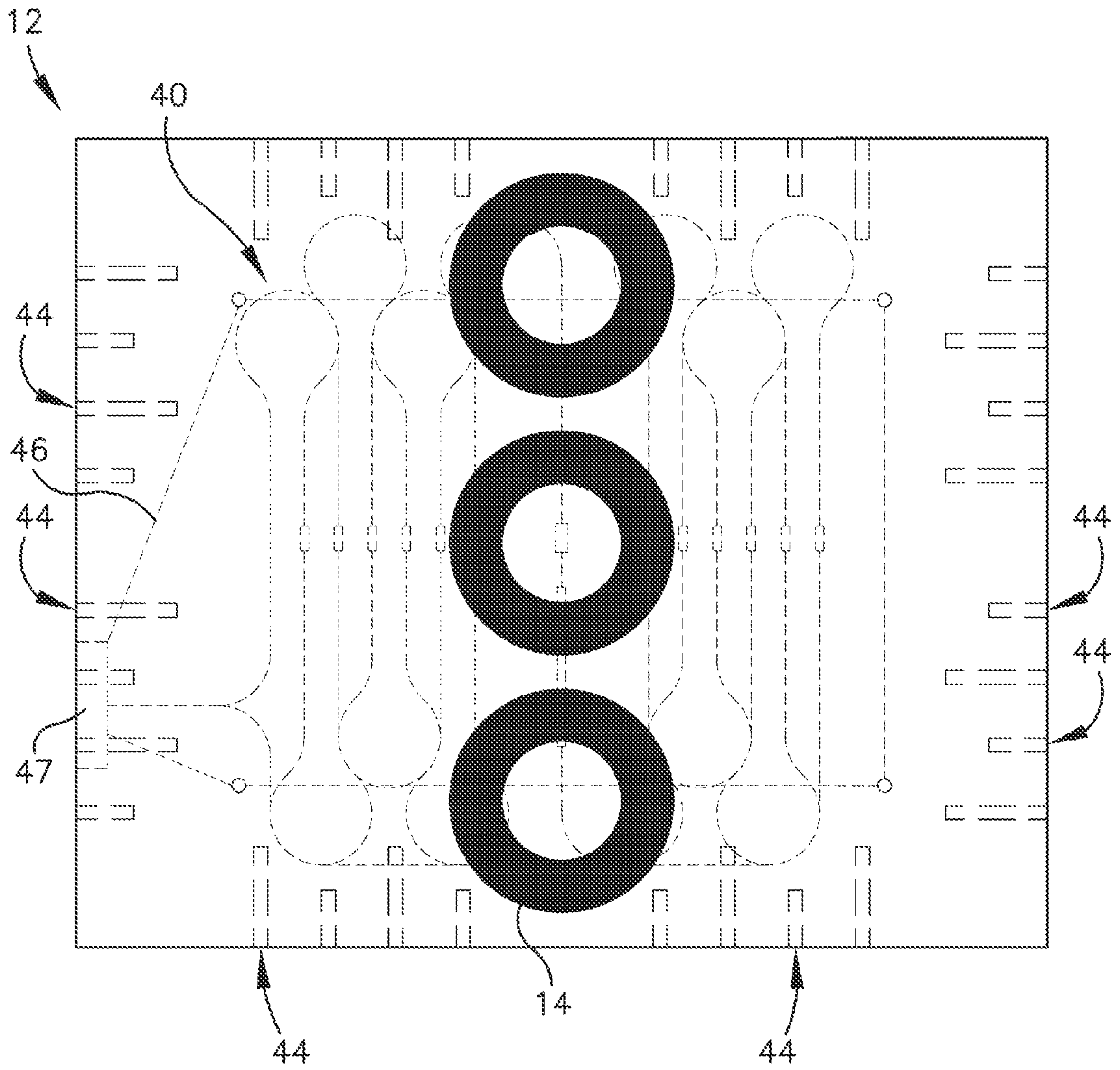
FIG. 2 is a top schematic view of one of the pavement slabs of FIG. 1 illustrating sensors and edge connectors.

Turning to FIG. 2, in one or more embodiments each slab 12 includes a strain sensor array 40. The strain sensor array 40 is distributed at least partly, and preferably mostly, across the length and width of a body of the slab 12. The strain sensor array 40 may include one or more optical fiber sensors. The strain sensor array 40 may embody optical fiber sensing technologies including but not limited to one or more of Rayleigh, Brillouin, Raman, or Fiber Bragg Grating (FBG) technologies, with corresponding sensors or sampling area(s) distributed along the length of the fiber(s).

In one or more embodiments comprising FBGs, the FBGs are positioned in the optical fiber with selectable space therebetween. Each FBG, or any other method implemented as described above but not limited to those specifically named, provides a measurement of the strain of its surrounding environment, which is a local volume, element or region of the body AR. It should be noted that emitters and receivers of optical fiber sensors may comprise a single device or multiple devices. Generally, each FBG reflects an optical signal, of a particular wavelength or small band of wavelengths, that it receives. The characteristics, such as intensity, amplitude, wavelength, and/or time delay, of the optical signal reflection may vary according to a strain, potentially among other factors, placed on the FBG. One of ordinary skill will appreciate that various mechanisms for detecting strain—including mechanisms for detecting strain using other optical fiber sensing technologies—may be employed in the strain sensor array 40 within the scope of the present invention.

The optical fibers of the array 40 shown in FIG. 2 are implemented in elongated loops with enlarged turns on each end, with the loops being arranged in an alternating pattern offset relative to adjacent loops along the y-axis. However, one of ordinary skill will appreciate that sensors may be implemented within a body of pavement material in other patterns—for example, in a serpentine pattern layout, a coil pattern layout, a grid pattern, an array of individual fiber optic lines, or other geometric pattern layouts, without departing from the spirit of the present invention. Moreover, a sensor array may include more or fewer optical fibers and/or may comprise additional or alternative strain sensors (e.g., piezoelectric strain sensors) without departing from the spirit of the present invention.

The sensor array 40 may include and/or be in communication with supporting components—such as an embedded interrogator—within the scope of the present invention. For example, embodiments of the present invention are interoperable with the paving systems and sensor array(s) described in U.S. Patent Publication 2021/0222375 A1 to Sylvester, filed Apr. 9, 2021, which is hereby incorporated by reference herein in its entirety. In one or more embodiments, the control center 16 is in electronic communication (e.g., via the communication element 26) with an interrogator which, in turn, operates in conjunction with the fiber optic sensors of the sensor array 40 to generate sensor data.

Figure 4:
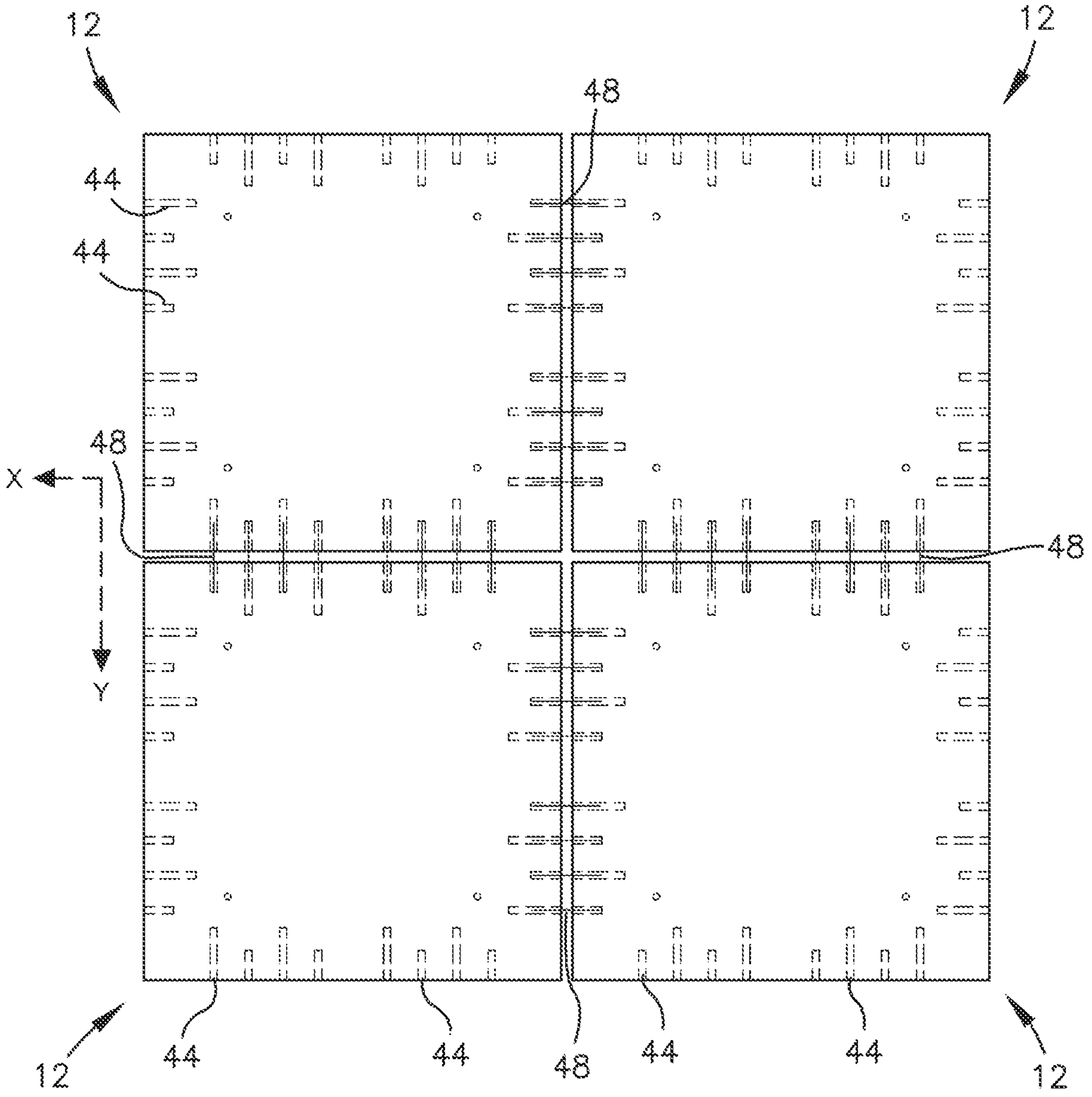
FIG. 4 is a top schematic view of the plurality of modular pavement slabs of FIG. 1, illustrating the slabs connecting together via load-transferring connectors.

Turning briefly to FIG. 4, the slabs 12 of the illustrated embodiment also include structural links comprising load-transferring connectors 48 (e.g., dowel rods), discussed in more detail below. However, it should be noted that the paving material of the roadway and delineations between sections or sensing volumes, and associated structural components, may vary within the scope of the present invention. For example, cast-in-place concrete sections delineated by saw cut joints (e.g., without load-transferring connectors), or continuous pour installations (e.g., comprising asphalt without reinforcement layers or load-transferring connectors) are also within the scope of the present invention.

In one or more embodiments, a sensing volume of a section of pavement may comprise an area of the roadway monitored by a sensor array comprising fiber optic cable(s) and one or more interrogator(s), where each interrogator transmits and receives optical signals reflecting stress and strain in the section. In one or more embodiments, a sensing volume of a section of pavement comprises an area of the roadway delineated by physical boundaries comprising the sides of a precast slab or a combination of saw cut joints and sides of a cast-in-place concrete installation.

An advantage of the precast slabs 12 of the illustrated embodiment is realized through added data dimensionality available through monitoring condition and/or strains across multiple sensor arrays 40 respectively corresponding to multiple slabs 12 with load-transferring connectors 48 extending therebetween.

However, it is also foreseen that a sensor array may be omitted, alternatively configured or replaced by other sensing technologies without departing from the spirit of the present invention.

Returning to FIG. 1, the master controller of the control center 16 may additionally be in electronic communication (e.g., via wired connections 46 of FIG. 2) with and may receive strain sensor data from the strain sensor arrays 40 embedded in the slabs 12. The wired connections 46 may be routed via edge connectors 47 through one or more junction boxes 50 illustrated in FIG. 1 for communication to the master controller. The master controller may analyze the strain sensor data, alone and/or in communication with one or more remote server(s), to determine vehicle position on the pavement system and roadway sections and, accordingly, provide commands for activation/deactivation of the wireless chargers 14 and/or increasing or decreasing the voltage supplied to the wireless chargers 14.

The communication element 26 generally allows communication with systems or devices external to the control center 16. The communication element 26 may include signal or data transmitting and receiving circuits, such as antennas, amplifiers, filters, mixers, oscillators, digital signal processors (DSPs), and the like. The communication element 26 may establish communication wirelessly by utilizing RF signals and/or data that comply with communication standards such as cellular 2G, 3G, 4G, or 5G, IEEE 802.11 standard such as WiFi, IEEE 802.16 standard such as WiMAX, Bluetooth™, or combinations thereof. Alternatively, or in addition, the communication element 26 may establish communication through connectors or couplers that receive metal conductor wires or cables which are compatible with networking technologies such as ethernet. The communication element 26 may also couple with optical fiber cables, e.g., via an interrogator. The communication element 26 may be in communication with or electronically coupled to memory element 24 and/or processing element 22.

Preferably the devices of the pavement system communicate via secure and/or encrypted communication means. For example, all or some of the slabs 12, the control center 16 and remote server(s) may securely exchange transmissions using DES, 3DES, AES-128 or AES-256 encryption and/or RSA (748/1024/2048 bit) or ECDSA (256/384 bit) authentication. It is foreseen that any means for secure exchange may be utilized without departing from the spirit of the present invention.

The memory element 24 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, USB ports, or the like, or combinations thereof. The memory element 24 may include, or may constitute, a "computer-readable medium." The memory element 24 may store the instructions, code, code segments, software, firmware, programs, applications, apps, services, daemons, or the like that are executed by the processing element 22, such as the software program 28. The memory element 24 may also store settings, data, documents, files, photographs, movies, images, databases, and the like, for example where such data is captured by additional infrastructure sensors and/or relates to utilization of the wireless chargers 14 by passing vehicles.

The processing element 22 may include processors, microprocessors, microcontrollers, DSPs, field-programmable gate arrays (FPGAs), analog and/or digital application-specific integrated circuits (ASICs), or the like, or combinations thereof. The processing element 22 may include digital processing unit(s). The processing element 22 may generally execute, process, or run instructions, code, code segments, software, firmware, programs, applications, apps, processes, services, daemons, or the like. The processing element 22 may also include hardware components, such as finite-state machines, sequential and combinational logic, and other electronic circuits that may perform the functions necessary for the operation of embodiments of the present invention. For example, the processing element 22 may execute the software program 28, where the software program 28 includes computer-readable instructions instructing the processing element 22 to complete all or some of the steps described herein. The processing element 22 may be in communication with the other electronic components through serial or parallel links that include address busses, data busses, control lines, and the like.

Figure 3A:
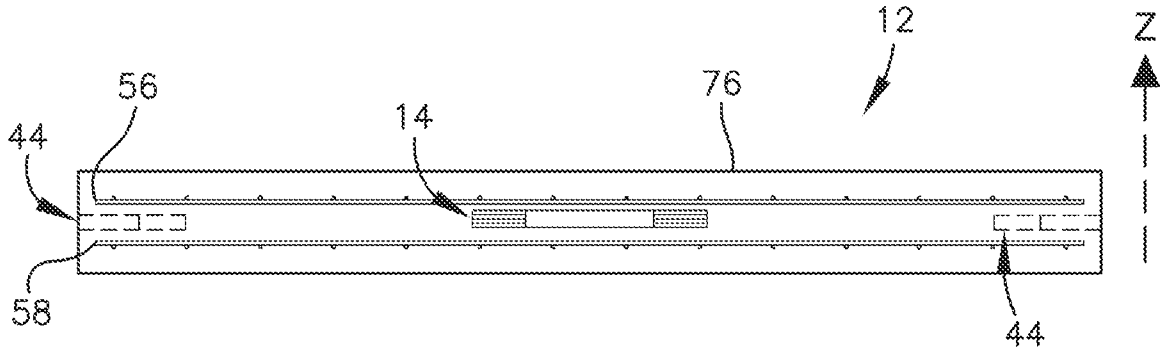
FIG. 3A is a cross-sectional elevated schematic view of one of the pavement slabs of FIG. 1 illustrating a wireless charger between internal reinforcement grids embedded therein.

The slabs 12 may also each include one or more internal reinforcement grid(s) 56, 58, as in FIG. 3A. Each internal reinforcement grid 56, 58 may comprise at least one layer of steel rebar lattice or other internal reinforcement structures such as fiberglass reinforcement mat, geotechnical mat, composite bars, carbon fiber mat, or loose reinforcement material such as fiberglass fibers, carbon fibers, plastic fibers, or metallic shavings. In one or more embodiments, the upper internal reinforcement grid 56 is embedded nearer to the top surface of the roadway section than the wireless battery charger(s) 14 and comprises only those materials listed above or otherwise which are non-metallic, non-ferrite material(s) and will not substantially interfere with, shield against, insulate and/or isolate the electromagnetic field (EMF) emitted upward from the wireless chargers 14, which are positioned below the upper internal reinforcement grids 56. More broadly, it is foreseen that embodiments of the present inventive concept are interoperable with the paving systems and apparatuses described in U.S. Patent Publication No. 2016-0222594 A1 to Sylvester (filed Mar. 30, 2016), and in U.S. Patent Publication No. 2017-0191227 A1 to Sylvester (filed May 16, 2016), each of which is hereby incorporated by reference herein in its entirety.

Broadly, it should be noted that a roadway section or slab may include one or more reinforcement grids or layers above and/or one or more reinforcement layers below the embedded wireless battery charger(s). Also or alternatively, reinforcement layers may be omitted from portion(s) above and/or from portion(s) below the wireless battery chargers within the scope of the present invention. For example, and with brief reference to FIG. 3B, in one or more embodiments a plurality of reinforcement layers, including an uppermost reinforcement layer 56' and a lower reinforcement layer 58', may be embedded below wireless battery charger 14', with no reinforcement layers being embedded above the wireless battery charger 14'. Such reinforcement layers may comprise magnetic shielding material and/or non-magnetic shielding material within the scope of the present invention. One of ordinary skill will appreciate that other variations on number and positioning of layers are within the scope of the present invention.

While it is foreseen, as noted above, that embodiments of the present invention may be constructed in the field—for example as part of cast-in-place concrete or continuous pour asphalt installations—or be pre-fabricated into an assembly that may be installed onsite, it is preferred that the strain sensor array 40 be encased and permanently fixed within the body during an offsite pre-fabrication process. The optical fiber sensors of the exemplary array 40 may be laminated and/or fixed to one or more sides of a reinforcement layer 56, 58 (fixed relationship not shown, but see, e.g., FIGS. 2-4 of U.S. Patent Publication No. 2017/0191227A1 incorporated by reference herein) of the slab 12 during fabrication, essentially extending in a substantially horizontal (XY) plane at a given height within the slabs 12.

More preferably, the sensors of the array 40 may be laminated and/or fixed to a bottom side of the lower or bottommost reinforcement layer 58 of the slab 12. Placement near the bottom of the body of the slab 12 may provide greater resolution from and/or amplification of data collected by the strain sensor array 40. Moreover, fixing the strain sensor array 40 to a reinforcement layer 56 and/or 58 may generate a more holistic data set representing changes in form across the entire body of the slab 12 because a preferred reinforcement layer 56, 58 will extend across substantially the entire length and width of the body of the slab 12 and may be less susceptible to localized distortions resulting from pockets or imperfections in the body of the slab 12.

It is foreseen that all or portions of a strain sensor array 40 may be encased at different and/or varying heights within a slab without departing from the spirit of the present inventive concept. For instance, disposing at least one sensor at a different height within the slab 12—such as vertically above or below a second sensor—may provide additional resolution for detecting defects in the slab 12. However, long dimensions of the exemplary optical fiber sensors are preferably in substantial alignment with a direction of travel, for example along the y-axis, which may improve detection of vehicular load progression across a top surface of the slab 12. Dimensions of optical fiber sensors that are transverse or perpendicular to the direction of travel may improve detection of the lateral position of such a vehicular load on the slab 12. It is foreseen that a preferable arrangement of optical fiber sensors, each sensor having a region of the pavement surface that it may optimally sense, and each sensor having an orientation that improves detection of the longitudinal or lateral position of the vehicle load and position, will result in a sensor layout presenting a grid of sensors oriented in the traverse and longitudinal dimensions such that their sensing areas overlap each other along the x and y axes to ensure that a maximum area of the pavement may be sensed simultaneously by one or more sensors (e.g., oriented to the direction of travel and/or lateral position of the vehicle load on the slab 12).

As noted above, in one or more embodiments, load-transferring connectors 48 (see FIG. 4) set in cavities 44 join the slabs 12 to one another along sides extending perpendicular to the direction of travel (i.e., in the "x" direction). In one or more embodiments, load-transferring connectors 48 also join the slabs 12 to one another along sides extending parallel to the direction of travel (i.e., in the "y" direction). The load-transferring connectors 48 may comprise, for example, dowel rods. However, in one or more embodiments, slabs 12 adjacent one another in the "x" direction may be joined using tie bars (not shown) or other load-transferring connectors. Interfaces between slabs 12 may also or alternatively incorporate a rubber skirt, backer board, spacing rod, tar mixture, grouting or similar buffering substance within the scope of the present invention. It is also foreseen that load-transferring connectors may be omitted along one or more sides of slabs or roadway sections without departing from the spirit of the present invention.

Turning now to more general discussion, prior art precast slabs are an advantageous alternative to continuous pour solutions, which have been more popular traditionally within the United States. Part of the appeal offered by precast paving systems is serviceability—when a portion of pavement requires service, it may be removed and replaced with relative ease as compared with similar repair efforts using continuous pour solutions aimed at restoring the pavement to like-new condition. With the advent of electric vehicles, the present applicant has discovered that embedding wireless charge elements into such precast slabs may be advantageous in reducing or eliminating drivers' time spent charging their electric vehicles. Further, in order to do so efficiently and economically, the present invention proposes shielding the wireless charge elements with an attenuating shroud, also embedded into such precast slabs, as described in more detail below.

In general, the shroud may at least partially circumscribe the wireless charger 14 and may include a lower segment having magnetic shielding material and an upper segment positioned between the lower segment and the driving surface 76 of the slab 12, for example. The upper segment may comprise non-magnetic shielding material, such that magnetic field lines of the magnetic field radiate from the wireless chargers through the driving surface or top surface 76 described herein. The lower segment and/or the upper segment may be electrically-insulating. However, the upper segment may be omitted from the shroud in one or more embodiments without departing from the scope of the technology herein.

Figure 3B:
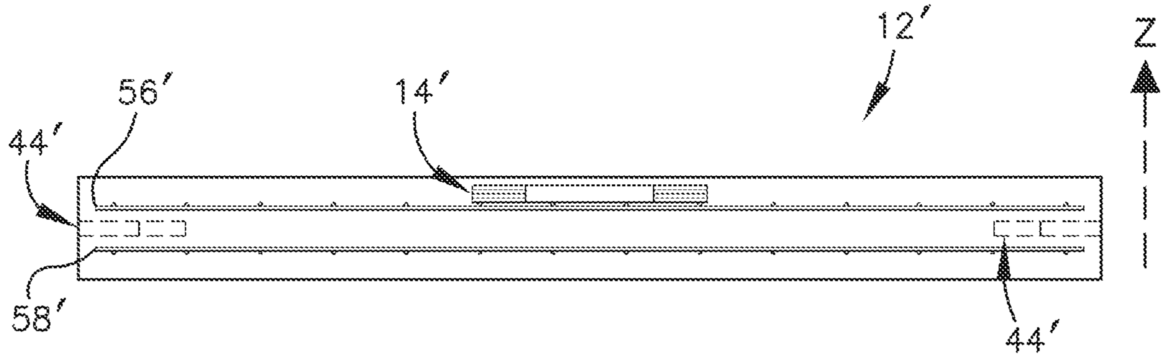
FIG. 3B is a cross-sectional elevated schematic view of one of the pavement slabs of FIG. 1 illustrating an alternative embodiment with the wireless charger above the internal reinforcement grids embedded therein.
Figure 6:
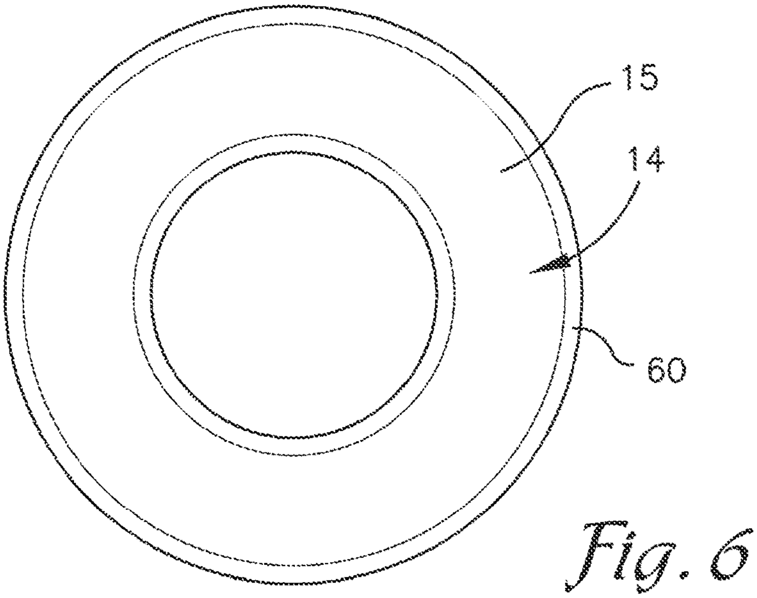
FIG. 6 is a top view of the wireless charger of FIG. 3 in accordance with one or more embodiments of the present invention, illustrating an electrically-conductive element and an attenuating shroud along a bottom and side edges of the electrically-conductive element.
Figure 7:
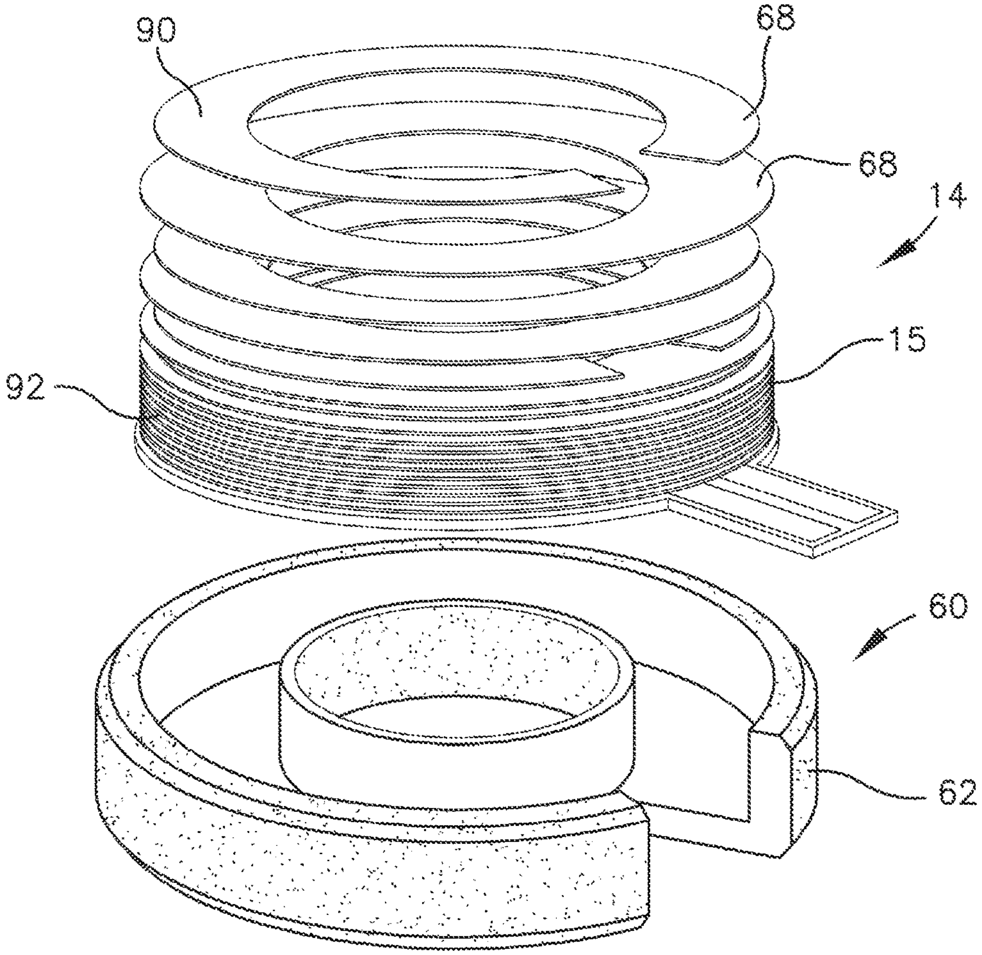
FIG. 7 is an exploded side perspective view of the wireless charger of FIG. 6, illustrating the electrically-conductive element as a stack of electrically-conductive sheets of material.

FIGS. 6-20 depict elements of various embodiments of wireless charging systems for embedding into the pavement as in FIGS. 3A-3B. In FIGS. 6-7, for example, the wireless charging systems generally include a wireless power charger (e.g., the wireless charger 14 or an electrically-conductive element 15 thereof) and a shroud 60 with at least a portion that is attenuating or reflective of magnetic field lines. In one or more embodiments, the wireless charging system may have more than one wireless charger 14 or more than one electrically-conductive element 15 of the wireless charger 14. The wireless charging system may be used in a roadway section (e.g., one of the slabs 12 described above and depicted in FIGS. 1-3) for enabling dynamic wireless power transfer to a vehicle. Specifically, the roadway section may include pavement material defining a driving surface (e.g., top surface 76 in FIG. 3) for the vehicle, the wireless charger 14 comprising the electrically-conductive element 15 connected to a power supply (e.g., via the control center 16), and the shroud 60 embedded in the pavement material and circumscribing the electrically-conductive element 15. The term "circumscribing" as used herein refers to the shroud 60 being generally about or around and adjacent to the electrically-conductive element, but not necessarily completely encircling it, In one or more embodiments, as depicted in FIGS. 6 and 7, the wireless chargers 14 comprise a stack of a plurality of conductive plates 68 and the shroud 60 is a hollow case. The individual conductive plates 68 may each form a circular path or only a partially circular path (such as a c-shaped path or a semi-circular path). The stack may have a top surface 90, a bottom surface opposite the top surface, and at least one side edge 92. These stacks of the conductive plates 68 may have a toroid or torus shape, for example, with the shroud 60 or a lower segment 62 thereof being a hollow case formed around or at least partially circumscribing the conductive plates 68.

The hollow case may have a generally toroid or torus shape including a bottom wall, an outer side wall, and an inner side wall, for example. In one or more embodiments, the hollow case has a hollow channel with an inner surface. The hollow case may also have any open or closed top. For example, in one or more embodiments, as in FIGS. 6-7, the upper segment is omitted with the hollow case being a plate having a hollow channel with an open top.

The shroud 60 or the lower segment 62 may surround the bottom surface and the at least one side edge 92 of the stack. For example, the hollow case may be formed using the matrix described below, as well as magnetic shielding material (e.g., ferrite powder) embedded in the matrix of the lower segment 62 and/or a remainder of the shroud 60.

Also or alternatively, the shielding material comprising the shroud 60 may be applied via a coating on the stack, as later described herein, to provide magnetic field scattering or redirection.

It should also be noted that, in one or more embodiments, a shroud or hollow case may have an outer surface with a rough texture configured for gripping or otherwise integrating the shroud or hollow case with surrounding pavement material comprising the precast pavement slab, as illustrated in FIG. 7.

Figure 8:
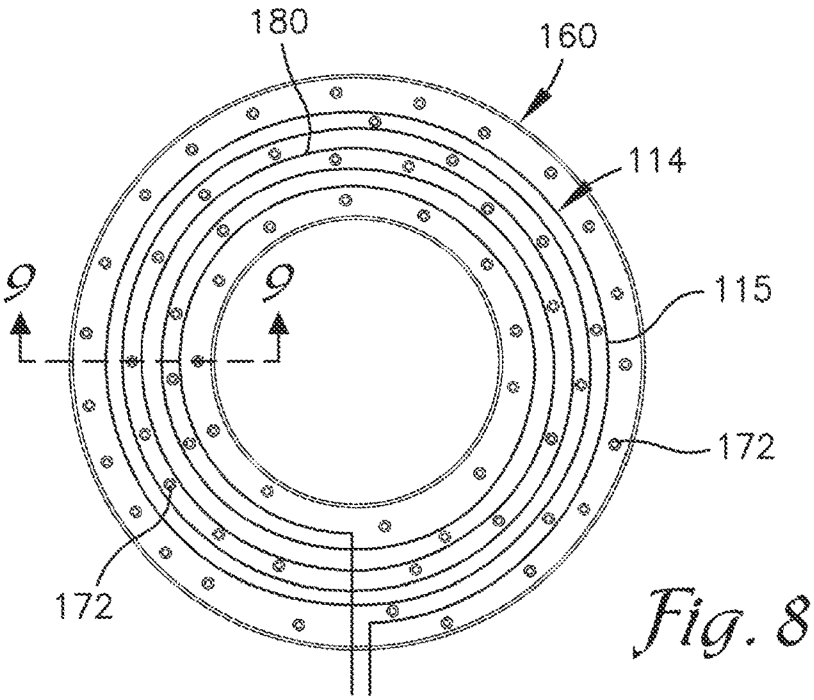
FIG. 8 is a top view of the wireless charger of FIG. 3 in accordance with an alternative embodiment of the present invention, illustrating the electrically-conductive element as a coiled wire within a hollow case, with holes formed therethrough.
Figure 9:
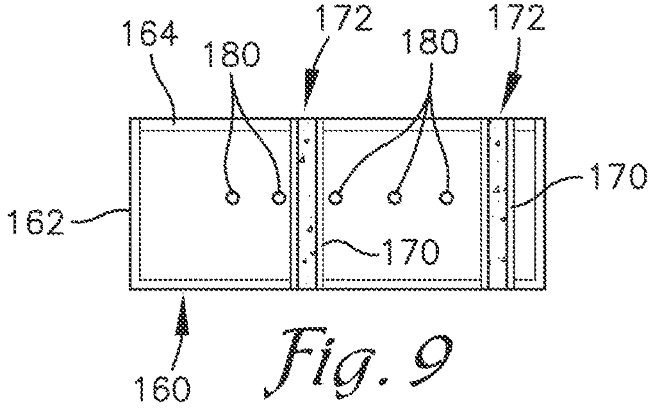
FIG. 9 is a cross-sectional view of the wireless charger of FIG. 8 taken along line 9-9 and illustrating the holes lined with an electrically-insulating material and pavement material extending therethrough.

In one or more embodiments, as depicted in FIGS. 8-9, a wireless charger 114 or its electrically-conductive element 115 (similar or identical to the wireless charger 14 and the electrically-conductive element 15 described above) comprises loops or turns of a coiled conductive wire 180 instead of or in addition to the stack of conductive plates 68. Furthermore, a shroud 160 (in one or more embodiments, similar or identical to the shroud 60 described above) may be, for example, a hollow case surrounding the wireless charger 114. The hollow case may have a toroid or torus shape encasing the loops of the coiled conductive wire 180, similar to the hollow case in FIGS. 6-7 described above.

The hollow case may include a non-magnetic shielding upper segment 164 forming at least a part of an upper portion of the case and a lower segment 162 forming at least a part of a lower portion of the case. Specifically, the lower segment 162 may include side and/or bottom surfaces of a hollow case (e.g., a hollow toroid-shaped case), with the upper segment 164 forming a top surface of the hollow case. For example, a ferrite plate (or, for example, a cured matrix embedded with a ferrite powder distributed therein) with bottom and side surfaces may circumscribe the bottom and outer perimeter (e.g., sides) of the electrically-conductive element comprising wire 180.

Additionally or alternatively, the upper segment in one or more embodiments may be a top portion of an electrically-insulating sheath coated onto coiled wires (e.g., wire 180) of the electrically-conductive element within the hollow case, and/or may be an electrically-insulating filler occupying the space within the hollow case surrounding the electrically-conductive element, with such a filler also forming a top portion of the charger. The hollow case or shroud 160 in such embodiment(s) may be formed using the matrix described below, as well as the magnetic shielding material or ferrite powder described herein which is embedded in the matrix of the lower segment 162 of the shroud 160 and/or applied via a coating thereto. In one or more embodiments, the shroud 160 may have an outer surface with a rough texture configured for gripping or otherwise integrating with the surrounding pavement material comprising the precast pavement slab.

Furthermore, in one or more embodiments where the shroud 160 includes a hollow case, the hollow case may surround the wireless charger 114 and/or conductive element 115, and one or more openings 172 or perforations may be formed into or through the hollow case. For example, as depicted in FIGS. 8 and 9, such openings 172 are formed between turns of the loops of conductive wire 180 in spaced apart relation with each other. Specifically, the shroud 160 may be a case with upper and lower portions or segments, with the case surrounding the electrically-conductive element 115 and defining a plurality of upper perforations and a plurality of corresponding or aligned lower perforations. The pavement material may penetrate therethrough and at least partially fill the upper and lower pluralities of perforations and, in one or more embodiments, the column or space(s) between the upper and lower perforations.

In one or more embodiments, each of the one or more openings 172 or perforations, and possibly intervening column(s) or spaces extending therebetween, is lined with an electrically-insulating material (e.g., liner 170). For example, the liner 170 may be a channel or tunnel of electrically-insulating material extending from the upper perforations down to their corresponding lower perforations. This allows for pavement material of the slab 12 to flow through the openings 172 and create a more secure and robust attachment to the wireless charger 114 and/or the shroud 160 thereof, while still protecting the electrically-conductive element 115 within the shroud 160 from the elements/external environment (e.g. water, chemicals, and the like). Specifically, pavement material penetrating one of the plurality of upper perforations and a corresponding or aligned one of the plurality of lower perforations may form a continuous column of cured pavement material. In one or more embodiments, the column of cured pavement material has a smallest dimension perpendicular to the z-axis (or diameter) of one and one quarter inches (>1.25"). Other methods for assisting the shroud 160 in gripping to or otherwise integrating with the pavement may be used without departing from the scope of the technology described herein. For example, the shroud 160 may have an outer surface with a rough texture configured for gripping surrounding pavement material comprising the precast pavement slab, similar to the texture depicted in FIG. 7 on the shroud 60.

Figure 10:
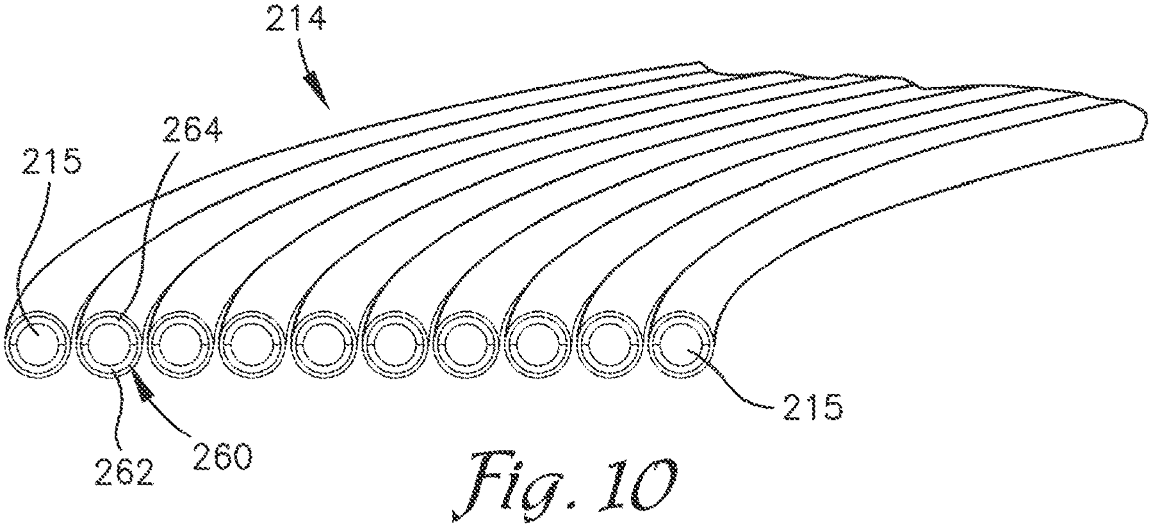
FIG. 10 is a fragmentary perspective view of the wireless charger of FIG. 3 in accordance with another alternative embodiment of the present invention, illustrating a wire coiled and coated in a sheath with attenuating portions embedded therein.
Figure 11:
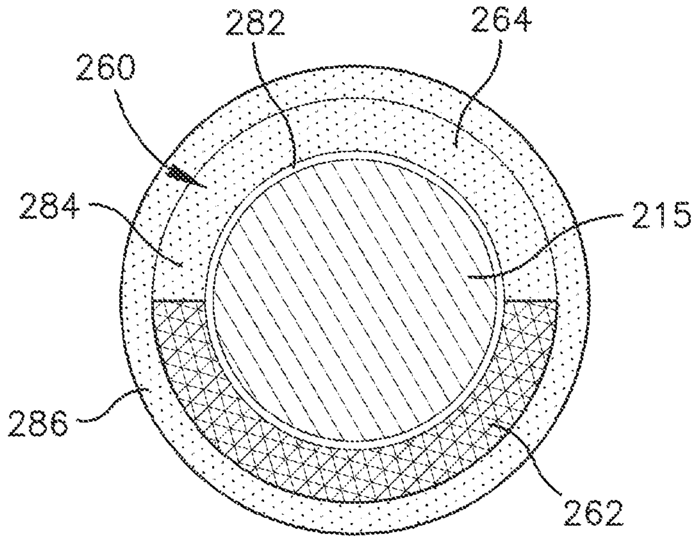
FIG. 11 is a cross-sectional elevation view of the wire and the sheath of FIG. 10.

Turning to FIGS. 10-11, in one or more embodiments, a wireless charger 214 or its electrically-conductive element 215 comprises loops of a coiled conductive wire and a multi-layered shroud 260. The shroud 260 includes a lower segment 262 comprising magnetic shielding material (as in other embodiments, this may comprise a plate of shielding material and/or a matrix with embedded distributed shielding material therein) and an upper segment 264 positioned between the lower segment 262 and the driving surface 76 of the slab 12, for example. The upper segment 264 may comprise non-magnetic shielding material. The lower segment 262 and/or the upper segment 264 may be electrically-insulating and/or thermally conductive. However, the upper segment 264 may be omitted from the shroud 260 in one or more embodiments without departing from the scope of the technology herein. In general, the upper segment 264 may be free of magnetic-shielding materials such that magnetic field lines of the magnetic field radiate from the wireless chargers 214 through the driving surface or top surface 76 described herein.

In one or more embodiments, an electrically-insulating sheath is interposed between the lower segment 262 and the electrically-conductive element 215. Additionally, the electrically-insulating sheath may also be interposed between the upper segment 264 and the electrically-conductive element 215, and/or may be integral with the upper segment 264, in one or more embodiments. Also or alternatively, in one or more embodiments, a matrix material comprising the lower segment 262 and/or upper segment 264 may itself be electrically-insulating, as noted elsewhere herein. The shroud 260 may perform magnetic shielding between the electrically-conductive element 215 and items below and/or horizontally or laterally next to the electrically-conductive element 215. For example, in one or more embodiments, the shroud 260 and specifically the lower segment 262 thereof includes a magnetic shielding material, while the upper segment 264 includes a non-magnetic shielding material (e.g., is comprised of polymer and free of magnetic-shielding materials). Sheath-like embodiments of the shroud 260, as depicted in FIGS. 10-11, wrap around the electrically-conductive element 215 and/or are adjacent to or in contact with the electrically-conductive element 215 or the associated electrically-insulating sheath.

As used herein, the term "magnetic shielding material" means any material exhibiting a relative magnetic permeability of at least four (4). In certain embodiments, the magnetic shielding material used will exhibit a relative magnetic permeability of at least at least eight (8), at least ten (10), at least one hundred (100), at least five hundred (500), or at least one thousand (1000). In certain preferred embodiments, such as when the magnetic shielding material comprises ferrite, the magnetic shielding material will have a relative permeability between fifteen hundred (1,500) and three thousand (3,000). Furthermore, in one or more embodiments, the magnetic shielding materials used herein may have a relative magnetic permeability that is at least four (4), at least eight (8), at least ten (10), at least one hundred (100), at least five hundred (500), or at least one thousand (1000) times greater than that of the material from which the roadway sections 10 are formed (e.g., concrete). Examples of magnetic shielding materials include iron, steel, and ferrite. Correspondingly, the term "non-magnetic shielding material" means any material exhibiting a relative magnetic permeability of less than four (4). Examples of non-magnetic shielding material include aluminum, copper, brass, polymers, and fiberglass.

The lower segment 262 of the shroud, in one or more embodiments, preferably circumscribes bottom and/or sides of the electrically-conductive element 215. For example, the lower segment 262 may have a top boundary along or adjacent laterally opposing sides or margins of a turn of the electrically-conductive element 215, with this top boundary being vertically located anywhere between a top and a bottom of the electrically-conductive element 215 (e.g., at or near a midpoint thereof). For example, as depicted in FIG. 11, the lower segment 262 and the upper segment 264 each form one half of a circumferential cross-section, with these segments' respective upper and lower boundaries meeting at laterally opposing sides or opposite outer margins of the illustrated turn of the electrically-conductive element or wire 215.

In one or more embodiments, the shroud 260 is a unitary, electrically-insulating sheath circumscribing at least a portion of the electrically conductive element or wire 215 and/or individual turns or loops of the element 215. The lower segment 262 may comprise a ferrite or other magnetic shielding material powder distributed and embedded in a matrix and/or may be a coating over the electrically conductive element 215, with the magnetic shielding powder being absent from the upper segment 264. For example, the unitary, electrically-insulating sheath may have ferrite powder or other magnetic shielding materials embedded in the matrix of the lower segment 262 (e.g., see FIG. 11). Furthermore, the upper and lower segments 262, 264 may be a unitary matrix with the upper segment 264 lacking the ferrite powder.

The shroud 260 and/or other shroud or sheath embodiments described herein may be rated AD6, AD7, or AD8 (pursuant to IEC Technical Committee standard(s) such as IEC 60529 propagated as of the date of the initial filing of this disclosure), for example, to protect from surrounding environment and/or the elements, including by sealing against ingress of water or chemicals in accordance with such ratings. However, other ratings may be used without departing from the scope of the technology described herein. The matrix may comprise the pavement material and/or a polymer (e.g., a polymer selected from the group consisting of rubbers and elastomers). For example, the matrix may include epoxy resin, hard plasters, plastics, acrylic, high impact polystyrene, and the like. The matrix preferably has elasticity similar to that of typical wire insulation materials, to protect against mechanical damage from forces transferred through surrounding paving material. For example, the hardness scale of the matrix may be above a 50 on the Shore D hardness scale in one or more embodiments. (The Shore D Hardness Scale generally measures the hardness of hard rubbers, semi-rigid plastics and hard plastics.)

In one or more embodiments, a ferrite or other magnetic shielding powder may be distributed within a coating applied to an outer surface of the unitary, electrically-insulating sheath (e.g., comprising the matrix described above) along the lower segment 262 of the shroud 260, or applied directly to the electrically-conductive element 215. In one or more embodiments, the matrix and the magnetic shielding (e.g., ferrite) powder of the lower segment may comprise a coating on a bottom of the electrically-conductive element and/or on opposite sides of turns or segments of the electrically-conductive element.

While the shroud 260 is depicted as comprising multiple layers of material (e.g., a multi-layered sheath), one or more embodiments may include one single layer of material (e.g., a single-layered sheath or matrix as described above). FIGS. 10-11 depict one or more wires (i.e., turns or segments of the electrically-conductive element 215) with multiple layers of sheaths fully or mostly circumscribing each of the wires or wire segments. Specifically, in FIG. 11, a radially inner first sheath 282 is an electrically-insulating and non-magnetic shielding sheath, and adjacent second sheath 284 circumscribes the first sheath 282 and is the shroud 260 (including the lower segment 262 and the upper segment 264). Furthermore, in one or more embodiments, a third sheath 286 circumscribes the second sheath 284 (as depicted in FIG. 11) and may likewise be an electrically-insulating and non-magnetic shielding sheath, as with the first sheath 282. In one or more embodiments, the lower segment 262 may be coated in the magnetic-shielding material or magnetic-shielding material may otherwise be incorporated into the second layer's lower segment 262, while the second layer's upper segment 264 may be electrically-insulating (or electrically-isolating) but is made of non-magnetic shielding material.

FIG. 10 depicts multiple turns of the wire (i.e., electrically-conductive element 215) depicted in FIG. 11, arranged in a coil-like configuration, with each successive turn or loop of the coiled wire 215 and its corresponding shroud or sheath 260 looping around an adjacent radially outer side of and/or circumscribing (e.g., adjacent and/or abutting) the immediately prior turn or loop of the wire 215. For example, the electrically conductive element 215 may comprise at least one wire coated in electrically-isolating or electrically-insulating material and placed in a coiled configuration with a plurality of turns defining spaces therebetween. In one or more embodiments, at least some of these spaces may be filled with portions or columns of the pavement material comprising the precast pavement slab, thereby allowing for a more secure attachment or embedding of the wireless charger 14 within the slab 12 and/or enhancing the structural integrity of the slab 12.

In one or more embodiments, a lower segment of a shroud comprises ferrite powder distributed or scattered beneath and/or around an outer perimeter or lateral sides of an electrically-conductive element within the precast pavement slab, such as the slab 12 in FIG. 3. In such an embodiment, the electrically-conductive element may still be covered in sheaths and/or in hollow cases, for example to protect the electrically-conductive element from ingress of water, chemicals, or the like and/or provide electrical insulation, but the ferrite or other magnetic shielding powder distributed or scattered beneath and/or around an outer perimeter or lateral sides of the electrically-conductive element may be used to scatter or redirect magnetic field lines. However, paths from the electrically-conductive element to the top surface 76 may remain free of the ferrite powder in these embodiments, so as to provide a path for the magnetic field lines up through the top surface 76 of the slab 12 for charging the vehicles thereon.

Figure 12:
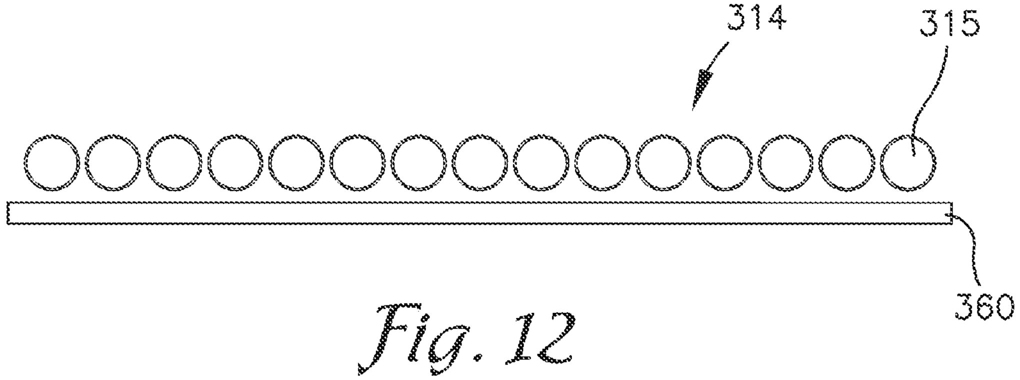
FIG. 12 is a cross-sectional elevation view of a coiled wire with a plate serving as magnetic shielding below the wire, in accordance with embodiments of the present invention.

Additionally or alternatively, as depicted in FIG. 12, a wireless charger 314 or its electrically-conductive element 315 (e.g., similar or identical to the electrically-conductive element 215) is embedded in a slab (e.g., the slab 12) above a plate 360 made of material similar or identical to the shroud 60 described above. The plate 360 may serve the same purpose as the lower segments of the shrouds described above, in regard to scattering or redirecting the magnetic field lines of the electrically-conductive element 315. For example, the plate 360 may be a ferrite plate extending beneath the wireless charger 314 as in FIG. 12. In yet another alternative embodiment, a wireless charger 314' may be embedded in a slab with an alternative plate 360' that extends beneath and to opposing sides (e.g., see FIG. 13) of the wireless charger 314' or its electrically-conductive element 315'. The plate 360, 360' may thus block and/or reflect at least a portion of the magnetic flux or magnetic field lines from the wireless charger 314, 314'. In one or more embodiments, a layer of pavement material (e.g., pavement material of the slab 12) is interposed between the electrically-conductive element 315, 315' and the ferrite plate (e.g., the plate 360 or the plate 360'). Such an interposed layer may be at least one-half an inch (½") thick, one inch (1") thick, or two inches (2") thick.

Figure 13:
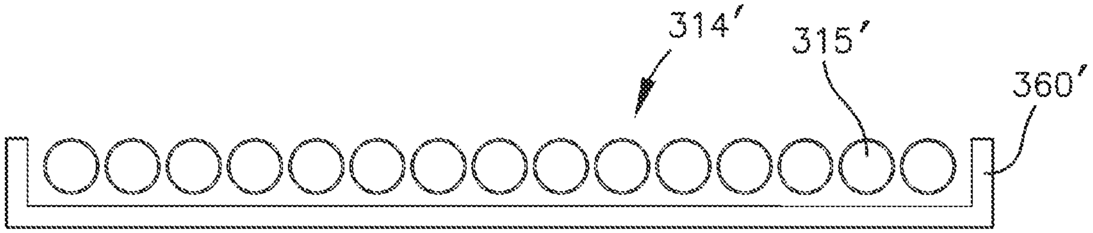
FIG. 13 is a cross-sectional elevation view of a coiled wire with a plate serving as a magnetic shielding below and to the sides of the wire, in accordance with embodiments of the present invention.
Figure 14:
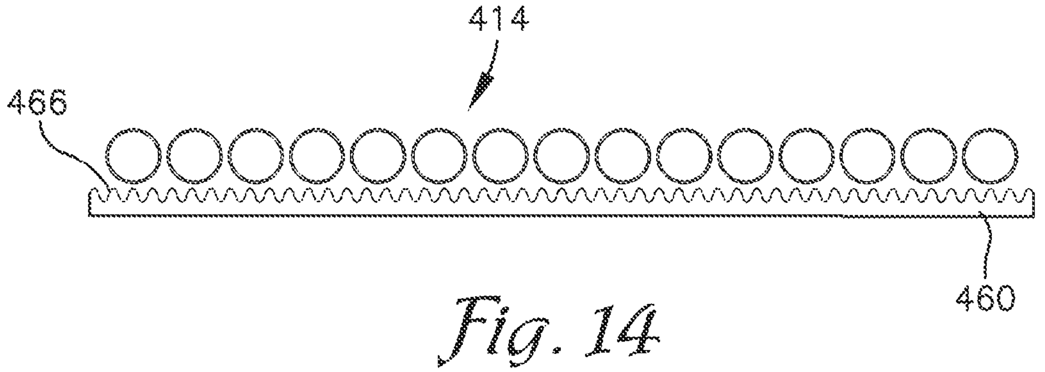
FIG. 14 is a cross-sectional elevation view of a coiled wire with a plate having a non-planar cross-sectional profile for redirecting magnetic field lines, in accordance with embodiments of the present invention.
Figure 15:
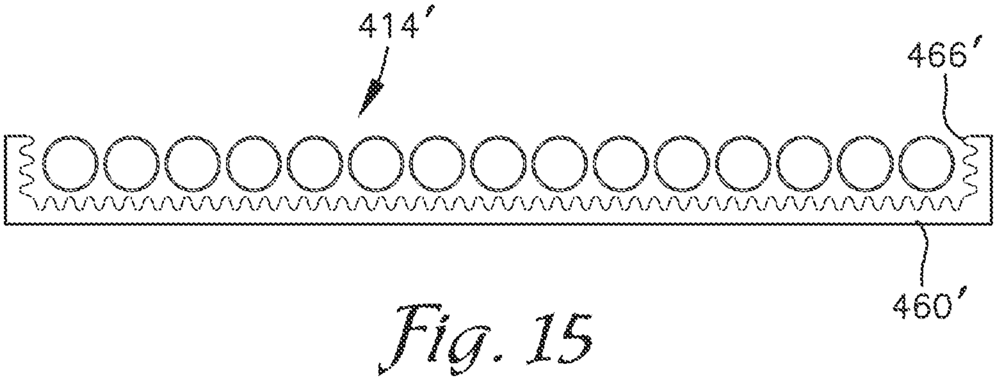
FIG. 15 is a cross-sectional elevation view of a coiled wire with a plate having a non-planar cross-sectional profile for redirecting magnetic field lines, the plate being generally squared off with side walls, in accordance with embodiments of the present invention.
Figure 16:
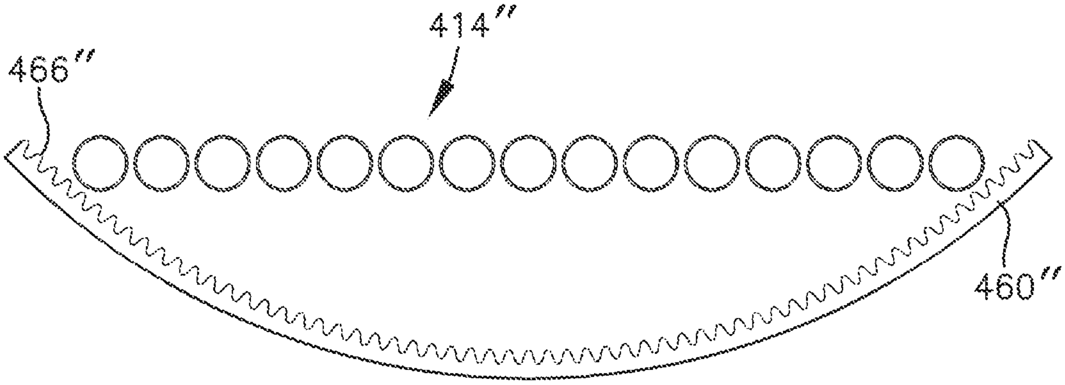
FIG. 16 is a cross-sectional elevation view of a coiled wire with a plate having a non-planar cross-sectional profile for redirecting magnetic field lines, the plate being generally curved below and to the sides of the coiled wire, in accordance with embodiments of the present invention.

In yet another embodiment, the plates 360, 360' depicted in FIGS. 12 and 13 may be replaced with one or more plates 460, 460', 460" having one or more non-planar cross-sectional profiles 466, 466', 466" and/or an otherwise non-planar inner surface, such as a sawtooth, square, or sinusoidal wave profile, as depicted in FIGS. 14-16. The inner surface is a surface of the plate 460, 460' or 460" (e.g., made at least partially of ferrite or other magnetic shielding material) proximate and/or closest to the electrically-conductive element of a corresponding wireless charger 414, 414' or 414". Each such inner surface, via the non-planar cross-sectional profile, blocks, scatters, and/or redirects at least a portion of the magnetic flux or the magnetic field emitted by the respective wireless charger 414, 414' or 414" or the electrically-conductive element thereof (e.g., scattering or redirecting the magnetic field upward toward the driving surface of the slab 12).

In one or more embodiments, at least some redirected magnetic field lines (vectors) are redirected via the shroud or a lower segment thereof. For example, at locations in a slab where, absent the magnetic-shielding of embodiments of the present invention, at least some of the magnetic field lines have no or minor upward or horizontal components, addition or insertion of the magnetic-shielding (e.g., of shroud 460) of embodiments of the invention creates or increases the upward and/or horizontal components of such lines (e.g., relative to a z-axis or the gravity vector), due to the interaction of these magnetic field lines with the magnetic-shielding material (e.g., its inner surface/non-planar cross-sectional profile 466).

In one or more embodiments, as depicted in FIG. 14, the cross-sectional profile 466 has a planar upper margin extending between opposite ends of the ferrite plate (e.g., extending across the crests of the illustrated profile 466). In other embodiments, a cross-sectional profile 466' of a plate 460' circumscribing at least a portion of a wireless charger 414' is generally squared off, as depicted in FIG. 15. In such embodiments, an inner margin may be defined with three linear segments extending respectively along the crests of the profile 466' at the bottom and two (2) opposite end or side segments. Furthermore, in one or more embodiments, as depicted in FIG. 16, a cross-sectional profile 466" of a plate 460" circumscribing at least a portion of the wireless charger 414" is generally rounded or curved. For example, the cross-sectional profile 466" may define a curved upper margin extending across the crests of the illustrated profile 466" between opposite ends of the ferrite plate.

Although sometimes referred to as a "ferrite plate" herein, it should be noted that the plates described above and depicted in FIGS. 12-19 may be replaced or supplemented/combined with other magnetic-shielding materials without departing from the scope of the technology described herein. Likewise, the plates described herein may comprise a ferrite material dispersed within a polymer that is electrically-insulating or electrically-isolating. In one or more embodiments, a layer comprising a non-conductive polymer or other non-conductive material may be interposed between the plate (e.g., the ferrite plate) and the wireless charger or electrically-conductive element thereof to reduce conduction between the electrically-conductive element and the plate. As in other embodiments described herein, a non-electrically conductive coating (e.g., a matrix or polymer sheath) may be placed over and/or around the electrically-conductive element (e.g., as depicted in FIGS. 14-16) and/or the shroud for sealing against ingress of water or chemicals.

Figure 17:
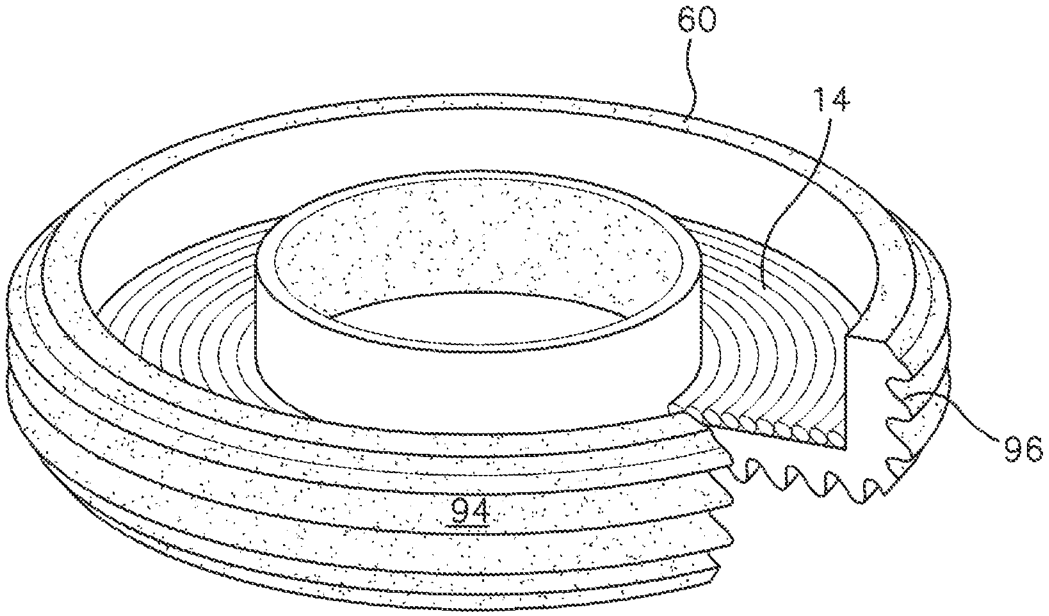
FIG. 17 is a perspective view of a shroud surrounding the wireless charger and having an external surface that is both micro-textured and macro-shaped, in accordance with embodiments of the present invention.
Figure 18:
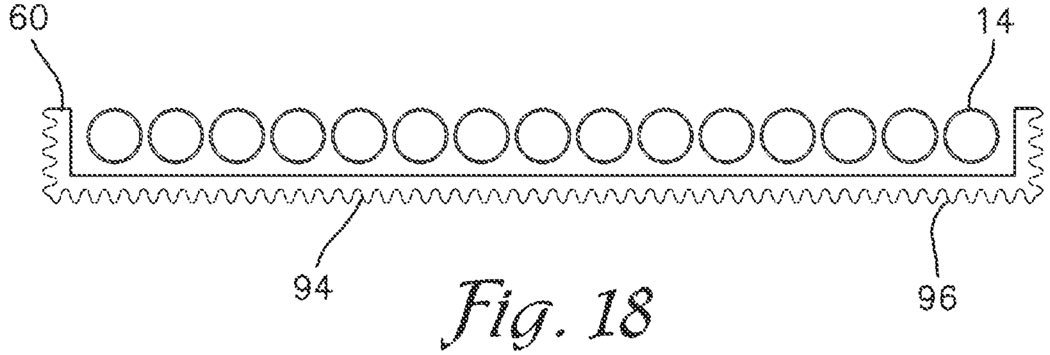
FIG. 18 is a cross-sectional elevation view of a wireless charger and a shroud having an external surface macro-shaped to have a non-planar cross-sectional profile, in accordance with embodiments of the present invention.
Figure 19:
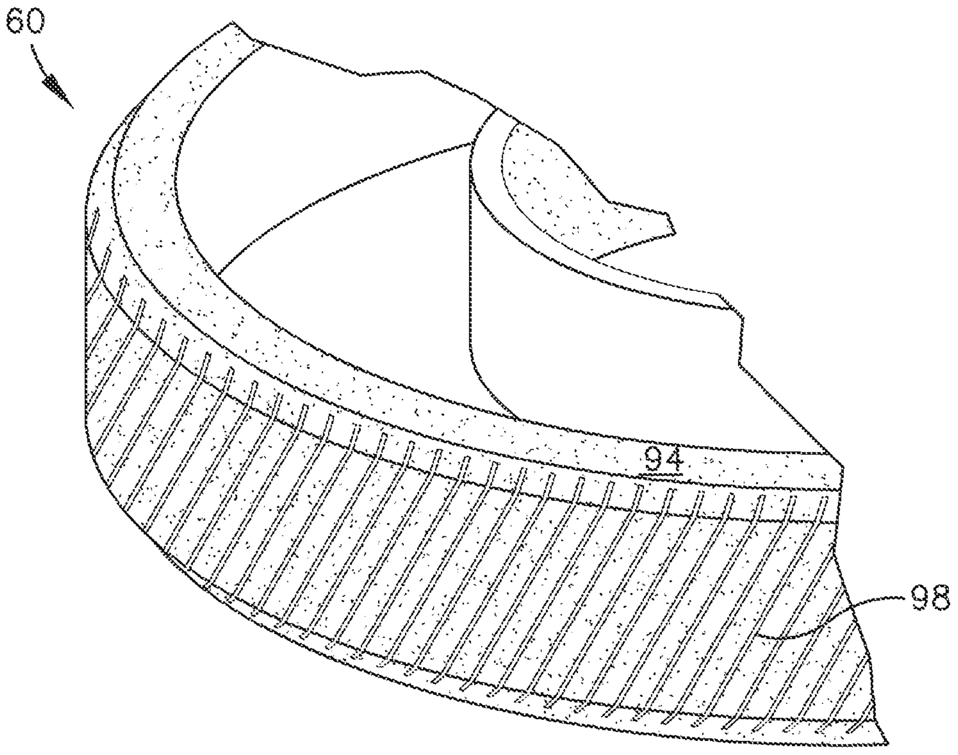
FIG. 19 is a fragmentary plan view of the shroud of FIG. 7, but with macro-shaped scores formed therein, in accordance with embodiments of the present invention.

In one or more embodiments of the shroud, as depicted in FIGS. 17-19, the shroud has an external surface 94 (opposite of an internal surface abutting and/or facing the conductive element of the wireless charger) with a micro-textured and/or a macro-shaped configuration for assisting with adherence to pavement material of the slab 12. In one or more embodiments, all surfaces comprising shroud material which are in contact with surrounding pavement material may be considered the external surface 94. The shroud may comprise any of the components described above, and/or may comprise carbon fiber or fiberglass in one or more embodiments.

The macro-shaping defined herein includes creating an overall non-planar cross-sectional profile for the external surface, with topographical variations of at least one millimeter or at least one centimeter from peak-to-valley ($R_{max}$) within a given sample length (e.g., within each one-foot square area or within each one meter square area). Micro-shaping the external surface or otherwise micro-texturing the external surface refers to the surface finish parameters or surface texture parameters, with topographical variations of less than half a millimeter (i.e., less than 500 μm) from peak-to-valley ($R_{max}$) within a given sample length. However, in one or more embodiments, the external surface can be both macro-shaped and micro-shaped (e.g., micro-textured) in the same region of the external surface. For example, a macro-shaped external surface (as depicted in a square wave cross-section in FIG. 20A) can be additionally micro-shaped or texturized (as depicted in the enlarged view of a portion of the square-wave cross-section in FIG. 20B) to have a rough finish.

FIGS. 17-18 depict examples of non-planar cross-sectional profiles for the external surface 94, such as the external surface 94 being macro-shaped with a sinusoidal cross-sectional profile 96. The non-planar cross-sectional profile can, in one or more embodiments, include a saw-tooth, a square wave (e.g., FIG. 20A with a wavelength labeled $WL_{mac}$) or a sinusoidal wave (e.g., FIG. 18) repeating across at least portions of the external surface. However, macro-shaping of the non-planar cross-sectional profile may include forming other irregular shapes or non-repeating shapes or topographies without departing from the scope of the technology herein. The macro-shaping may also or alternatively include corrugating and/or scoring the external surface. As depicted in FIG. 19, the scoring may form at least one channel 98 and at least one corresponding ridge. In one or more embodiments, the scoring forms on the external surface a grid of the channels 98 and/or ridges. However, other patterns and combinations of score marks or other such indentations can be used for the macro-shaping described herein without departing from the scope of the invention.

In one or more example embodiments, within one square foot of a macro-shaped portion of the external surface 94 of the shroud exists a line at least three-quarters (0.75) of a foot long, and along that line there are at least 3, at least 5, or at least 8 macro-shapes or pattern repeats (see FIG. 20A). A pattern repeat can include a repeating peak-valley structure such as score marks (with the ridge being the peak and the channel being the valley) or waveforms. However, such waveforms or peak-valley structures do not need to have peaks and valleys of equal length with other peak-valley structures and/or the same amplitude as other peak-valley structures, but rather can form a randomized topographical pattern of peaks and valleys. Each of the peak-valley structures may have an amplitude (e.g., depth of channel relative to ridge, or amplitude of a waveform) of at least 1 mm, at least 5 mm or at least 10 mm. In one or more example embodiments, amplitudes may vary in the range 1-20 mm. There are a number of methods known in the art for measuring macro-texture or macro-shaped surfaces, such as the sand patch method (e.g., in accordance with the standards laid out in ASTM E965 propagated as of the date of the initial filing of the present disclosure) or a laser device for measuring (e.g., in accordance with the standards laid out in ASTM E1845 propagated as of the date of the initial filing of the present disclosure).

Moreover, as noted elsewhere herein and illustrated in FIG. 20B, one or more (or all) of the peak-valley macro-shaped structures within the one square foot segment of the external surface (e.g., along the same three-quarters (0.75) of a foot segment) may also incorporate micro-textured or shaped surfaces with the exemplary amplitude and frequency characteristics discussed below. For example, FIG. 20B illustrates such micro-texturing comprising waves of micro-shaped amplitude and wavelength $WL_{mic}$—repeating at least three (3), at least seven (7), or at least ten (10) times-along a single wavelength $WL_{mac}$ of the macro-shaped structures.

FIG. 17 depicts the outer surface 94 having both a macro-shaped surface and a micro-textured or micro-shaped surface, in accordance with various surface finish parameters described herein. Such micro-textures are depicted by small randomized dots or protrusions in FIG. 17. However, such micro-textured surfaces can have topographies with a variety of shapes and dimensions without departing from the scope of the technology herein. Surface finish parameters or surface texture parameters, as defined herein, each generally refer to a surface's minor local deviations from a perfectly smooth surface. For example, the term "surface finish" may refer to the level of polishing or texturing applied to the surface of shroud. One of the surface texture parameters is "surface roughness." Surface texture parameters can be divided into three characteristics, including roughness, waviness, and lay. The roughness may be composed of smaller irregularities, while the waviness may consist of larger undulations. The lay may refer to the direction of a dominant grain or texture on the surface. These factors can be influenced by surface characteristics.

Surface roughness ($R_a$) is a way of quantifying the number of irregularities on a surface. The $R_a$ parameter represents the arithmetic average of all surface heights measured across a given area, as labeled in FIG. 20B. The enlarged view of a portion of the square wave surface profile depicted in FIG. 20A is illustrated in FIG. 20B, with a wavelength $WL_{mic}$ also labeled thereon. Thus, the wavelength of the macro-shaped surface in FIG. 20A ($WL_{mac}$) is many times greater than the wavelength of the micro-textured profile thereof ($WL_{mic}$) as depicted in FIG. 20B. However, note that while FIGS. 20A-20B depict embodiments with both micro-texture and macro-shaped external surfaces combined, some embodiments can include only one or the other without departing from the scope of the technology described herein.

$R_a$ measures, within a certain sampling length or sampling area, the average of the peaks and valleys of the surface. In general, the greater the deviations, the rougher the surface and if the $R_a$ is small, the surface is smooth. The $R_a$ may be calculated in micrometers (μm) or microinches (μin.), generally. The greater the $R_a$, the rougher the surface. For example, in one or more embodiments at least a portion of or one or more portions of the external surface of the shroud have a substantially rough surface with an $R_a$ of at least 6.3 μm, of at least 12.5 μm, of at least 25 μm, or of at least 50 μm. A maximum $R_a$ for micro-texture structures of a surface may be 100 μm, 500 μm, or 1000 μm. Likewise, in one or more embodiments, the at least a portion of or one or more portions of the external surface of the shroud have a substantially rough surface with micro-texture structures with an $R_a$ of at least 250 μin., of at least 500 μin., of at least 1,000 μin., or of at least 2,000 μin. A maximum $R_a$ for a micro-textured surface may be 0.1 inches. However, other units can be used without departing from the scope of the technology herein. For example, ISO grade numbers for roughness of the at least a portion of or one or more portions of the external surface can include N1 through N12 or beyond. In one or more embodiments, the ISO grade numbers for roughness of the external surface of the shroud are at least N9, at least N10, at least N11, or at least N12, with N11 and N12 typically categorized as "rough machining." Equivalent values for these surface finish grade numbers can be found, for example, in ISO 1302:1992, in each of the foregoing cases as propagated as of the date of the initial filing of the present disclosure. However, other conversion tables can be reference without departing from the scope of the technology as described herein.

Although $R_a$ is a useful average, there are various machined surface profiles that could still have the same $R_a$ value. Thus, another roughness parameter is the Rz (average maximum height of the profile), which measures the difference between the highest peak and lowest valley within the sampling length of five lines. It shows the maximum height of the profile. Moreover, the $R_q$ (the root-mean-square deviation of a profile, also referred to as RMS) can be used for the description of surface roughness. Another surface texture parameter is Rmax (vertical distance from peak to valley). Rmax is a roughness parameter that is particularly sensitive to anomalies such as scratches, scoring, and burrs.

In one or more embodiments, at least a portion or one or more portions of the external surface of the shroud has a substantially rough surface with an $R_q$ or RMS of at least 200, at least 300, at least 420, at least 560, at least 720, or at least 900. The at least a portion of the external surface or the one or more portions of the external surface can cover at least 10%, at least 20%, at least 40%, or at least 50% of the external surface of the shroud with this substantially rough surface. The $R_q$ or RMS can be measured per each square foot of area, each square inch of area, or any other sample size regularly used in the art for such surface finish parameters.

In use, a precast pavement slab (e.g., the slab 12 described above) has wireless chargers 14 embedded therein as in FIGS. 1-3. An electrical source or power supply (e.g., via the control center 16) may be electrically coupled to the wireless chargers 14 such that magnetic flux radiates from the wireless chargers 14 through a top surface 76 (as depicted in FIG. 3) of the precast pavement slab 12. Meanwhile, the shroud 60 (or other shroud embodiments described herein) prevents or restricts such magnetic flux or magnetic field lines from radiating below or generally laterally or horizontally to the sides of the wireless chargers 14. For example, as described in some of the embodiments above, the shroud 60 may redirect the magnetic flux or magnetic field lines from inner surfaces of the shroud 60, reflecting them upward and through the precast pavement slab 12 (e.g., through the slab and out the top surface 76). In one or more embodiments, a layer of pavement material comprising the precast pavement slab is interposed between the top surface 76 and the wireless charger 14 and defines a path between the electrically-conductive element and the top surface 76 of the precast pavement slab that is free of magnetic-shielding materials. This allows the emitted magnetic field to dynamically charge electric vehicles driving on the top surface 76 in a wireless manner.

Returning briefly to FIG. 2, in one or more embodiments, multiple wireless chargers 14 are spaced apart from each other within the slab 12. The plates or ferrite plates or other magnetic shielding layer(s) described above may assist in isolating the electrically-conductive elements of these multiple wireless chargers 14. For example, a first wireless power charger and a second wireless power charger embedded in the pavement material and comprising first and second electrically-conductive elements, respectively, may each be in electrical communication with the power supply and may be configured to emit a magnetic field for dynamic wireless power transfer to the vehicle. Likewise, a first shroud and a second shroud may each at least partially circumscribe the first and the second electrically-conductive element, respectively. The first shroud and the second shroud may each comprise magnetic shielding material facing a bottom side of these electrically-conductive elements (i.e., opposite the driving surface), thereby forming first and second plates or shielding layers, respectively. These first and second plates, in one or more embodiments, may have first and second non-planar cross-sectional profiles as described above. The first wireless power charger and the second wireless power charger may be spaced a lateral distance apart from each other in the pavement material. Advantageously, the lateral distance, the first shroud, and/or the second shroud may either individually or cooperatively provide conductance isolation and insulation against movement of current between the first electrically-conductive element and the second electrically-conductive element.

For purposes of this invention, the term "shroud" may include plates described, sheaths, hollow cases, magnetic shielding layers, or any other shielding components, examples of which are described herein. The "z axis" as used herein is formed along the shortest line drawn between a center of gravity of an electrically-conductive element of a wireless charger and the nearest portion of the top surface of the pavement. In one or more embodiments, the magnetic shielding layers or shroud described herein are wrapped and/or partially wrapped around an electrical insulator of the wireless charger, are wrapped directly around conductor coils of the wireless charger, or are otherwise positioned between the wireless charger 14 and the reinforcement layers (e.g., reinforcement grids 56 and/or 58).

Furthermore, the term "thermally conductive material" means a material within which heat freely flows, i.e., a material with a thermal conductivity greater than about five (5) watts per meter-kelvin. Examples of thermally conductive materials include steel, iron, aluminum, ferrite, composites (such as resins, fibers, plastics, etc.), oils and waxes. Correspondingly the term "non-thermally conductive material" as used herein means a material within which heat does not freely flow, i.e., a material with a thermal conductivity less than five (5) watts per meter-kelvin. Examples of non-electrically conductive materials include polymers. In one or more embodiments, shroud(s) and/or coating(s) for electrically-conductive element(s) of the wireless chargers partly or entirely comprise thermally conductive material.

Although the invention has been described with reference to example embodiments illustrated in the attached drawing figures, it is noted that equivalents may be employed and substitutions made herein without departing from the scope of the invention as described and claimed herein.

The invention claimed is:

1. A roadway section for enabling dynamic wireless power transfer to a vehicle, the roadway section comprising:

pavement material defining a driving surface for the vehicle;

a wireless power charger embedded in the pavement material and comprising an electrically-conductive element, the electrically-conductive element being in electrical communication with a power supply and configured to emit a magnetic field for dynamic wireless power transfer to the vehicle; and a shroud at least partially circumscribing the electrically-conductive element, the shroud having an external surface, wherein at least a portion of the external surface has a macro-shaped non-planar cross-sectional profile integrating the shroud with the pavement material surrounding the shroud, the macro-shaped non-planar cross-sectional profile comprising at least one valley defined between two ridges at the at least the portion of the external surface of the shroud.

2. The roadway section of claim 1, wherein one or more portions of the external surface have a micro-texture with a roughness with an Rq or RMS of at least 200.

3. The roadway section of claim 1, wherein one or more portions of the external surface have a micro-texture with a roughness with an Rq or RMS of at least 560.

4. The roadway section of claim 1, wherein one or more portions of the external surface have a micro-texture with a roughness with an Rq or RMS of at least 720.

5. The roadway section of claim 1, wherein one or more portions of the external surface have a micro-texture with a roughness with an Rq or RMS of at least 900.

6. The system of claim 1, wherein the at least a portion of the external surface is at least 20% of the external surface.

7. The system of claim 1, wherein the macro-shaped non-planar cross-sectional profile has a sawtooth, a square wave, or a sinusoidal wave repeating pattern.

8. The system of claim 1, wherein the macro-shaped non-planar cross-sectional profile is corrugated.

9. The system of claim 1, wherein macro-shaped cross-sectional profile is at least partially formed by scoring.

10. The system of claim 9, wherein the scoring forms the at least one valley and two ridges.

11. The system of claim 9, wherein the scoring forms on the external surface a repeating pattern grid of the at least one valley defined between two ridges.

12. The system of claim 1, wherein the pavement material comprises concrete.

13. The system of claim 12, wherein the shroud is chemically and electrically inert in the concrete.

14. The system of claim 13, wherein the shroud comprises carbon fiber or fiberglass.

15. The system of claim 1, wherein a depth of the at least one valley relative to a depth of one or both of the two ridges at the external surface is at least 1 mm.

16. The system of claim 1, wherein one or more portions of the external surface have a micro-textured profile integrating the shroud with the pavement material surrounding the shroud.

17. The system of claim 16, wherein the one or more portions include the at least a portion of the external surface having the macro-shaped non-planar cross-sectional profile.

18. The system of claim 1, wherein the shroud is made of electrically-insulating material at least at the portion of the external surface where the macro-shaped non-planar cross-sectional profile is present.

19. The system of claim 1, wherein the shroud has a lower segment comprising magnetic shielding material, the shroud has an upper segment opposite the lower segment, and the upper segment of the shroud is free of magnetic-shielding materials.

20. The system of claim 1, wherein the pavement material comprises a precast pavement slab having a plurality of sides, further comprising a plurality of load-transferring connectors embedded along a side of the plurality of sides and attached to an adjacent structure, the plurality of load-transferring connectors being configured to transfer load on the precast slab corresponding to the passing vehicle between the precast slab and the adjacent structure.

* * * * *